US012764635B2

(12) United States Patent
Wen et al.

(10) Patent No.: US 12,764,635 B2
(45) Date of Patent: Oct. 13, 2026

(54) DATA ROUTING METHOD AND APPARATUS, NODE, AND STORAGE MEDIUM

(71) Applicant: VIVO MOBILE COMMUNICATION CO., LTD., Guangdong (CN)

(72) Inventors: Ming Wen, Guangdong (CN); Jinhua Liu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 316 days.

(21) Appl. No.: 18/430,463

(22) Filed: Feb. 1, 2024

(65) Prior Publication Data

US 2024/0205794 A1 Jun. 20, 2024

Related U.S. Application Data

(63) Continuation of application No. PCT/CN2022/108946, filed on Jul. 29, 2022.

(30) Foreign Application Priority Data

Aug. 4, 2021 (CN) ......................... 202110893480.9

(51) Int. Cl.
*H04W 40/32* (2009.01)
*H04W 40/28* (2009.01)
*H04W 40/34* (2009.01)

(52) U.S. Cl.
CPC ........... *H04W 40/32* (2013.01); *H04W 40/28* (2013.01); *H04W 40/34* (2013.01)

(58) Field of Classification Search
CPC ..... H04W 40/32; H04W 40/28; H04W 40/34; H04W 40/248; H04W 84/04; H04L 45/00;
(Continued)

(56) References Cited

U.S. PATENT DOCUMENTS

2020/0383030 A1 12/2020 Cho et al.
2021/0127319 A1 4/2021 Huang et al.
(Continued)

FOREIGN PATENT DOCUMENTS

CN 110351109 A 10/2019
CN 110351700 A 10/2019
(Continued)

OTHER PUBLICATIONS

Akl et al. U.S. Appl. No. 63/104,353, filed Oct. 22, 2020 (Year: 2020).*
First Office Action for Chinese Application No. 202110893480.9, dated Oct. 31, 2024, 8 Pages.
Extended European Search Report Application No. 22852058.1, dated Oct. 22, 2024, 11 Pages.
(Continued)

*Primary Examiner* — Wutchung Chu
(74) *Attorney, Agent, or Firm* — Foley & Lardner LLP

(57) ABSTRACT

A data routing method and apparatus, a node, and a storage medium, and belongs to the field of communication technologies. The data routing method in this embodiment of this application includes: receiving, by a boundary node, a packet in a first topology. Determining, by the boundary node, ownership of a destination node of the packet based on first information in a header of the packet; and in a case that a destination node of the packet belongs to the second topology, re-writing, by the boundary node, a header of the packet based on the first information; and transmitting, by the boundary node, the re-written packet to the destination node in the second topology.

14 Claims, 7 Drawing Sheets

(58) Field of Classification Search
CPC ....... H04L 45/02; H04L 45/04; H04L 45/745; H04L 45/74
See application file for complete search history.

(56) References Cited

U.S. PATENT DOCUMENTS

| | | | | |
|---|---|---|---|---|
| 2023/0082294 | A1* | 3/2023 | Lee | H04W 40/24 |
| 2023/0199879 | A1* | 6/2023 | Zhu | H04W 36/0033 370/329 |
| 2023/0362779 | A1* | 11/2023 | Zhu | H04W 40/06 |
| 2024/0022965 | A1* | 1/2024 | Diao | H04W 76/18 |
| 2024/0031860 | A1* | 1/2024 | Zhu | H04W 28/0273 |
| 2024/0048486 | A1* | 2/2024 | Lagrange | H04L 45/745 |
| 2024/0172085 | A1* | 5/2024 | Diao | H04W 40/22 |
| 2024/0179608 | A1* | 5/2024 | Tesanovic | H04W 36/10 |
| 2024/0205794 | A1* | 6/2024 | Wen | H04W 40/32 |
| 2024/0349168 | A1* | 10/2024 | Akl | H04L 45/04 |

FOREIGN PATENT DOCUMENTS

| | | | |
|---|---|---|---|
| GB | 2605960 | A | 10/2022 |
| WO | 2020164546 | A1 | 8/2020 |

OTHER PUBLICATIONS

Huawei, HiSilicon “Inter-donor topology routing, F1 over NR access link and CHO” 3GPP TSG-RAN WG2 Meeting #114-e, Electronic, May 2021, R2-2106280, 6 Pages.
Qualcomm “CB#39 IAB_TopoRed” 3GPP TSG-RAN WG3 #112-e, Online, May 2021, R3-212679, 35 Pages.
International Search Report and Written Opinion for Application No. PCT /CN2022/108946, dated Oct. 31, 2022, 9 Pages.
Qualcomm Incorporated “Inter-topology BAP routing” 3GPP TSG-RAN WG3 Meeting #114-e, E-meeting, May 2021, R2-2104859, 5 Pages.
Canon Research Centre France “Discussion on Inter-donor topology redundancy” 3GPP TSG-RAN WG2 Meeting #114-e, E-meeting, May 2021, R2-2105861, 6 Pages.
Intel Corporation “Inter-donor CU topology migration” 3GPP TSG RAN WG2 Meeting #115-e, Electronic meeting, Aug. 2021, R2-2107445, 4 Pages.
Qualcomm “CB#39 IAB_TopoRed” 3GPP TSG-RAN WG3 #112-e, Online, May 2021, R3-21xxx, 28 Pages.
Fujitsu “Discussion on inter-donor topology redundancy” 3GPP TSG-RAN WG3 Meeting #112-e, Online, May 2021, R3-212048, 5 Pages.

* cited by examiner

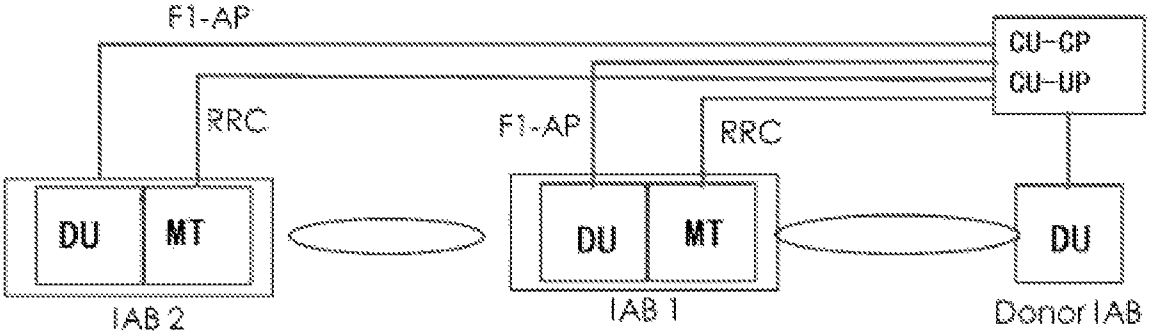

CP: Control plane (CU-Control Plane)
DU: Distributed unit
MT: Mobile terminal
CU: Centralized unit
RRC: Radio resource control
UP: User plane (CU-User Plane)
IAB: Integrated access backhaul
Donor IAB: IAB donor node
F1-AP: F1 application protocol (application protocol, AP)

FIG. 3

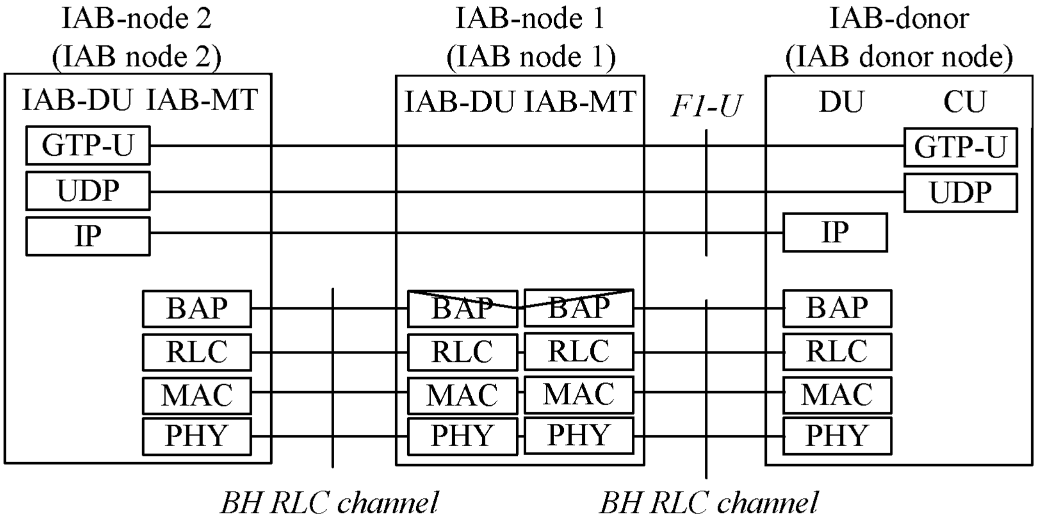

DU: Distributed unit
MT: Mobile terminal
IAB: Integrated access backhaul
GTP-U: GPRS tunnelling protocol-user plane (GPRS Tunnelling Protocol-User Plane)
UDP: User Datagram Protocol (User Datagram Protocol)
IP: Internet Protocol (Internet Protocol)
BAP: Backhaul adaptation protocol layer
RLC: Radio link control layer
PHY: Physical layer
MAC: Media access control layer

FIG. 4

DATA ROUTING METHOD AND APPARATUS, NODE, AND STORAGE MEDIUM

CROSS-REFERENCE TO RELATED APPLICATIONS

This application is a continuation of International Application No. PCT/CN2022/108946 filed on Jul. 29, 2022, which claims priority of Chinese Patent Application No. 202110893480.9 filed on Aug. 4, 2021, which are incorporated herein by reference in their entireties.

TECHNICAL FIELD

This application pertains to the field of communication technologies, and specifically relates to a data routing method and apparatus, a node, and a storage medium.

BACKGROUND

If data in a first topology needs to be sent to a terminal through a second topology, the second topology needs to configure corresponding route mapping for the packet. First, the data is routed to a boundary node, and the boundary node re-writes a header of the packet. Then, the boundary node routes the data to a node in the second topology.

However, the boundary node cannot determine whether data currently sent to the boundary node needs to be sent to the second topology, resulting in high complexity of data routing and excessive resource occupation.

SUMMARY

Embodiments of this application provide a data routing method and apparatus, a node, and a storage medium, to resolve a problem of high complexity of data routing and excessive resource occupation.

According to a first aspect, a data routing method is provided. The method includes:

- receiving, by a boundary node, a packet in a first topology;
- determining, by the boundary node, ownership of a destination node of the packet based on first information in a header of the packet;
- in a case that the destination node of the packet belongs to a second topology, re-writing, by the boundary node, the header of the packet based on the first information; and
- transmitting, by the boundary node, a re-written packet to the destination node in the second topology.

According to a second aspect, a data routing method is provided. The method includes:

- generating, by a generation node in a first topology, a packet, where a header of the packet includes first information, and the first information is used to indicate ownership of a destination node of the packet; and
- sending, by the generation node, the packet to a boundary node.

According to a third aspect, a data routing apparatus is provided. The apparatus includes:

- a first receiving module, configured to receive a packet in a first topology;
- a first determining module, configured to determine ownership of a destination node of the packet based on first information in a header of the packet;

- a first re-writing module, configured to: in a case that the destination node of the packet belongs to a second topology, re-write the header of the packet based on the first information; and
- a first transmission module, configured to transmit a re-written packet to the destination node in the second topology.

According to a fourth aspect, a data routing apparatus is provided. The apparatus includes:

- a first generation module, configured to generate a packet in a first topology, where a header of the packet includes first information, and the first information is used to indicate ownership of a destination node of the packet; and
- a first sending module, configured to send the packet to a boundary node.

According to a fifth aspect, a boundary node is provided. The boundary node includes a processor, a memory, and a program or an instruction that is stored in the memory and can be run on the processor, and the program or the instruction is executed by the processor to implement the steps of the method according to the first aspect.

According to a sixth aspect, a boundary node is provided, including a processor and a communication interface. The communication interface is configured to:

- receive a packet in a first topology.

The processor is configured to:

- determine ownership of a destination node of the packet based on first information in a header of the packet; and
- in a case that the destination node of the packet belongs to a second topology, re-write the header of the packet based on the first information.

The communication interface is further configured to:

- transmit a re-written packet to the destination node in the second topology.

According to a seventh aspect, a generation node is provided. The generation node includes a processor, a memory, and a program or an instruction that is stored in the memory and that can be run on the processor, and the program or the instruction is executed by the processor to implement the steps of the method according to the second aspect.

According to an eighth aspect, a generation node is provided, including a processor and a communication interface. The processor is configured to:

- generate a packet in a first topology, where a header of the packet includes first information, and the first information is used to indicate ownership of a destination node of the packet.

The communication interface is configured to:

- send the packet to a boundary node.

According to a ninth aspect, a readable storage medium is provided. The readable storage medium stores a program or an instruction, and the program or the instruction is executed by a processor to implement the steps of the method according to the first aspect or the steps of the method according to the second aspect.

According to a tenth aspect, a chip is provided. The chip includes a processor and a communication interface, the communication interface is coupled to the processor, and the processor is configured to run a program or an instruction to implement the method according to the first aspect or the method according to the second aspect.

According to an eleventh aspect, a computer program/program product is provided. The computer program/program product is stored in a non-transient storage medium, and the program/program product is executed by at least one processor to implement the steps of the method according to the first aspect or the steps of the method according to the second aspect.

In the embodiments of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

BRIEF DESCRIPTION OF DRAWINGS

FIG. 3 is a schematic structural diagram of a CU-DU of an IAB system according to an embodiment of this application;

FIG. 4 is a schematic diagram of a protocol stack according to an embodiment of this application;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms “first”, “second”, and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by “first” and “second” are usually of a same type, and the number of objects is not limited. For example, there may be one or more first objects. In addition, in the specification and claims, “and/or” represents at least one of connected objects, that is, A and/or B represent three cases: only A, only B, and both A and B are included, and the character “/” generally represents an “or” relationship between associated objects.

It should be noted that technologies described in the embodiments of this application are not limited to a Long Time Evolution (Long Time Evolution, LTE)/LTE-Advanced (LTE-Advanced, LTE-A) system, and may further be applied to other wireless communication systems such as Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), single-carrier frequency division multiple access (Single-carrier Frequency-Division Multiple Access, SC-FD-MA), and other systems. The terms “system” and “network” in the embodiments of this application may be used interchangeably. The technologies described can be applied to both the systems and the radio technologies mentioned above as well as to other systems and radio technologies. The following describes a New Radio (New Radio, NR) system for example purposes, and NR terms are used in most of the following descriptions. These technologies can also be applied to applications other than an NR system application, such as a 6th generation (6th Generation, 6G) communication system.

Figure 1:
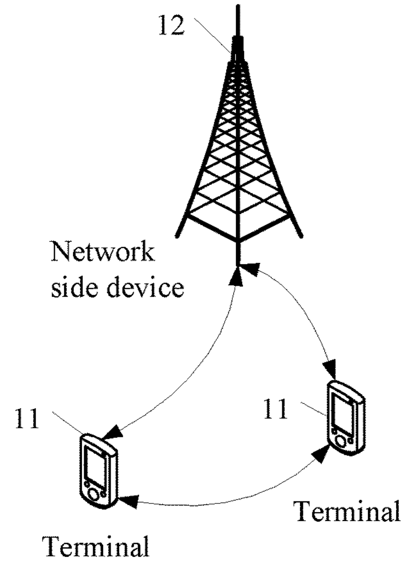
FIG. 1 is a structural diagram of a wireless communication system to which the embodiment of this application can be applied.

FIG. 1 is a structural diagram of a wireless communication system to which the embodiments of this application can be applied. The wireless communication system includes a terminal 11 and a network side device 12. The terminal 11 may also be referred to as a terminal device or user equipment (User Equipment, UE). The terminal 11 may be a terminal side device such as a mobile phone, a tablet personal computer (Tablet Personal Computer), a laptop computer (Laptop Computer) or a notebook computer, a personal digital assistant (Personal Digital Assistant, PDA), a palm computer, a netbook, an ultra-mobile personal computer (ultra-mobile personal computer, UMPC), a mobile internet device (Mobile Internet Device, MID), an augmented reality (augmented reality, AR)/virtual reality (virtual reality, VR) device, a robot, a wearable device (Wearable Device), vehicle user equipment (VUE), pedestrian user equipment (PUE), a smart household (a household device with a wireless communication function, such as a refrigerator, a television, a washing machine, or furniture), and the wearable device includes a smart watch, a smart band, a smart headset, smart glasses, smart jewelry (a smart bangle, a smart bracelet, a smart ring, a smart necklace, a smart anklet, and a smart chain), a smart wrist strap, a smart dress, a game console, and the like. It should be noted that a specific type of the terminal 11 is not limited in the embodiments of this application. The network side device 12 may be a base station or a core network The base station may be referred to as a NodeB, an evolved NodeB, an access point, a base transceiver station (Base Transceiver Station, BTS), a radio base station, a radio transceiver station, a basic service set (Basic Service Set, BSS), an extended service set (Extended Service Set, ESS), a NodeB, an evolved NodeB (eNB), a home NodeB, a home evolved NodeB, a WLAN access point, a WiFi node, a transmitting receiving point (Transmitting Receiving Point, TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the following describes in detail a data routing method and apparatus, a node, and a storage medium provided in the embodiments of this application by using some embodiments and application scenes thereof.

Figure 2:
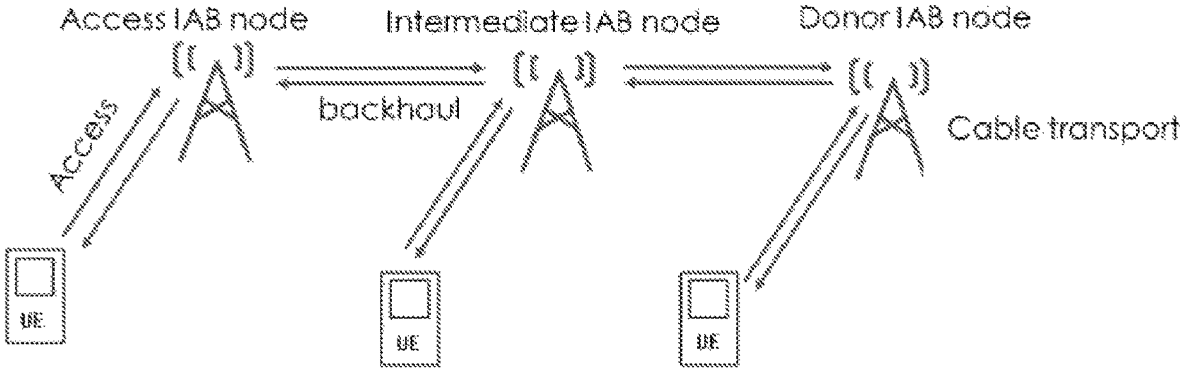
FIG. 2 is a schematic diagram of an IAB system according to an embodiment of this application.

First, the following content is introduced:

An integrated access backhaul (integrated access backhaul, IAB) system is a technology in a communication system. FIG. 2 is a schematic diagram of an IAB system according to an embodiment of this application. As shown in FIG. 2, one IAB node includes a distributed unit (Distributed Unit, DU) function part and a mobile terminal (Mobile Terminal, MT) function part. Depending on the MT, an access node (IAB node) may find an upstream access point (parent IAB node), and establish a wireless connection to the DU of the upstream access point. The wireless connection is referred to as a backhaul link (backhaul link). After an IAB node stablishes a complete backhaul link, the IAB node enables a DU function, and the DU provides a cell service, that is, the DU may provide an access service for UE. A backhaul topology includes an IAB donor node (donor IAB node) (or referred to as an IAB donor). The donor IAB node has a directly connected wired transmission network.

The IAB system includes a centralized unit-distributed unit (Centralized Unit-Distributed Unit, CU-DU). FIG. 3 is a schematic structural diagram of a CU-DU of an IAB system according to an embodiment of this application. As shown in FIG. 3, in a backhaul topology, DUs of all IAB nodes are connected to one CU node, and this node configures the DUs. The CU configures an MT through a radio resource control (Radio Resource Control, RRC) protocol. A donor IAB node is not provided with an MT function part.

The introduction of the IAB system can resolve a problem that the wired transmission network is not deployed properly when access points are deployed intensively. That is, when there is no wired transmission network, the access points may rely on wireless backhaul.

A radio link between IAB nodes is referred to as a backhaul link (BH link), and a backhaul radio link control channel (Backhaul RLC channel, BH RLC channel) is configured on the BH link for wireless backhaul.

FIG. 4 is a schematic diagram of a protocol stack according to an embodiment of this application. As shown in FIG. 4, a backhaul adaptation protocol (backhaul adaptation protocol, BAP) is further introduced into the IAB to forward data, route a packet, control traffic, and the like.

For inter-topology routing (inter-topology routing), a boundary node (boundary IAB-node) may re-write (re-writing) a BAP header of a packet based on a BAP routing ID 1 in a first topology carried in a header (BAP header) of the original packet, and fill a BAP routing ID 2 in a second topology into the BAP header of the packet.

Figure 5:
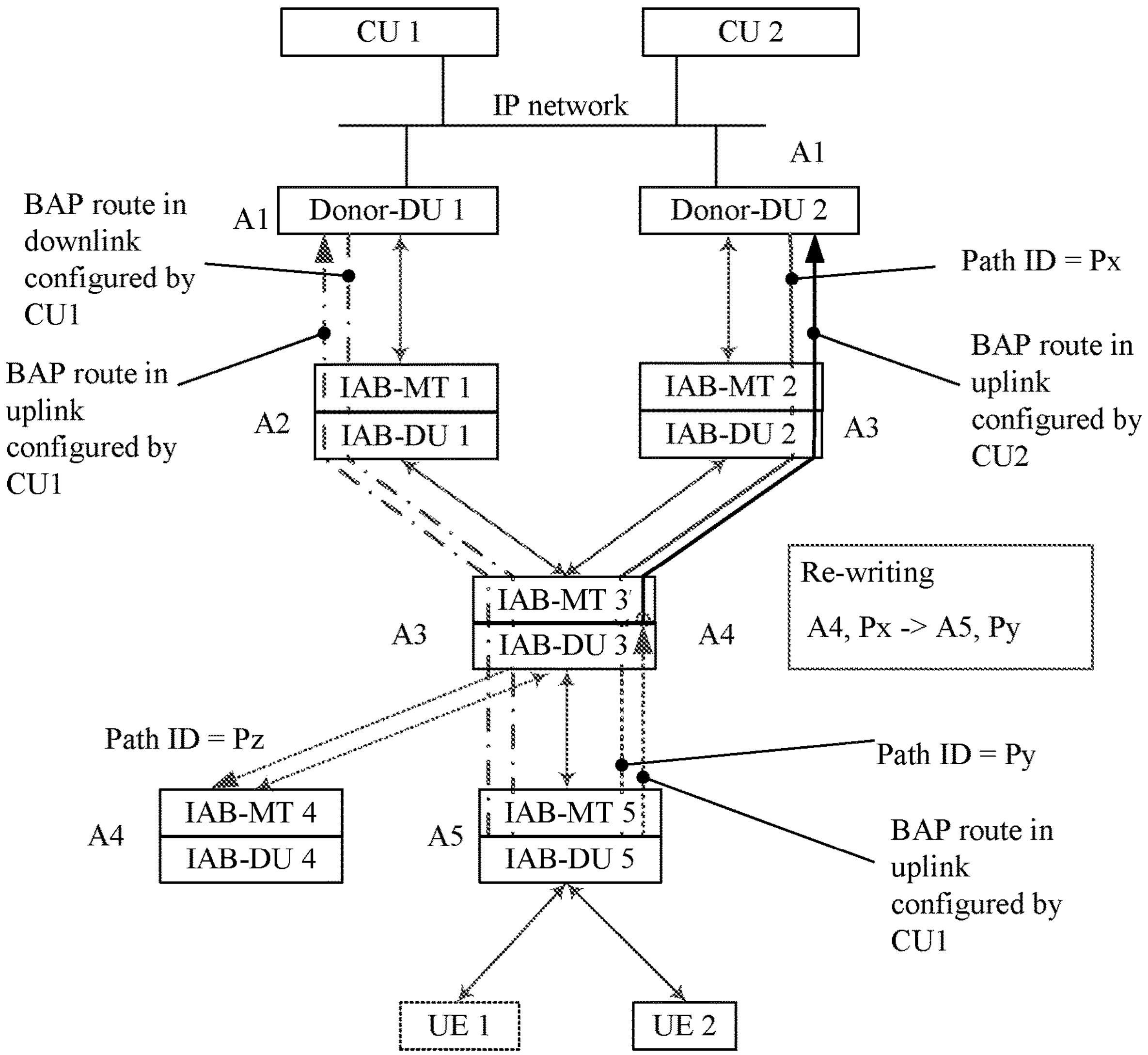
FIG. 5 is a schematic diagram of a cross-topology according to an embodiment of this application.

FIG. 5 is a schematic diagram of a cross-topology according to an embodiment of this application. As shown in FIG. 5, a boundary node (boundary IAB-node) means that if a DU of an IAB node and a DU of a parent node do not terminate to a same CU, this node is considered as a boundary node. In other words, the DU of this node and the DU of the parent node are not controlled by the same CU, but an MT of the boundary IAB node simultaneously accesses different CUs, for example, an IAB3 node.

A first topology (First topology) is a topology segment before a boundary node that a packet experiences in a transmission process. For example, for downlink data generated at a CU 2, a solid line part on the right side in the figure is a first topology. If uplink data that needs to be sent to the CU 2 is generated by an IAB4, a dotted line part consisting of all points is a first topology.

A second topology (Second topology) is a topology segment after a boundary node that a packet experiences in a transmission process. For example, for downlink data generated at a CU 2, a dotted line part consisting of all points is a second topology. If uplink data that needs to be sent to the CU 2 is generated by an IAB4, a solid line part on the right side in the figure is a second topology.

At present, the boundary node cannot distinguish the following two types of data:

(1) Data that requires packet header re-writing (BAP header re-writing): For example, if a CU 2 node helps a CU 1 node route data, the data needs to be transmitted to the IAB4 node. Therefore, when passing through an IAB3 node, BAP header re-writing needs to be performed for the data.

(2) Data that does not require BAP header re-writing: For example, data sent by the CU 2 to the IAB3 node is not transmitted after being received by the IAB3 node, but is delivered to an upper layer of the node.

If the boundary node selects Py of another second topology based on Px of the first topology, there are the following defects:

(a) Path ID space of the first topology is occupied. For example, Px needs to be different from a Path ID used by data that does not require route. Otherwise, the boundary node cannot distinguish whether re-writing is required.

(b) Because Px is used to indicate Py mapping in the second topology, a large amount of Path ID space needs to be further occupied.

It is assumed that two pieces of data need to be routed to different terminations in the second topology. One is for an IAB4, and the other is for an IAB5. Path IDs of the two pieces of data are Px1 and Px2, and cannot be the same. Otherwise, an intermediate node is mapped to a same routing ID. Therefore, both Px1 and Px2 represent a route A1->A3->A4 in the first topology, but a plurality of path IDs need to be used to represent the route.

(c) The boundary node needs to maintain a complex BAP header re-writing table, and each Px in the table needs to have a separate entry (Ay, Py).

That is, a large quantity of path IDS need to be occupied to perform inter-donor routing, thereby affecting allocation of path IDs in the topology. The CU 1 needs to maintain a complex BAP header re-writing table for each boundary node, which increases complexity of operations of the boundary node.

Therefore, it is not clear how to specifically distinguish whether data is delivered to the boundary node or whether BAP header re-writing needs to be performed for the boundary node, and re-writing is performed according to which mapping, to reduce difficulty of data routing and save resources.

Figure 6:
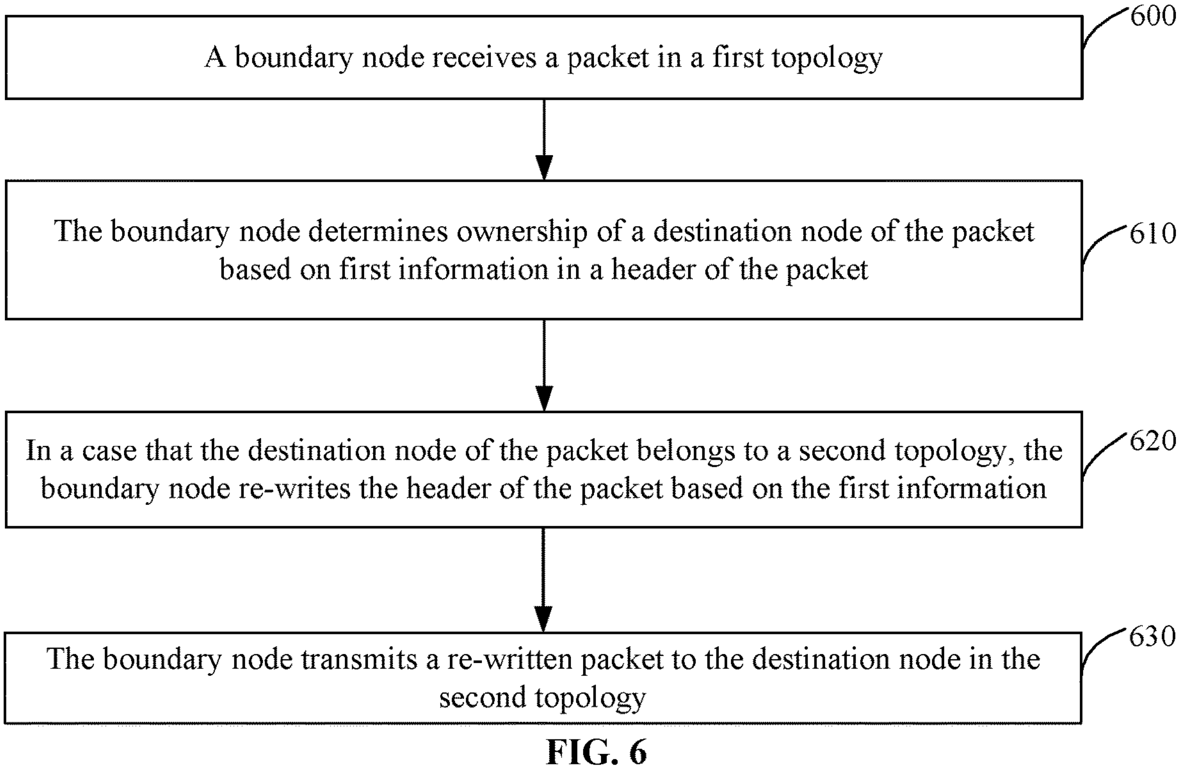
FIG. 6 is a first schematic flowchart of a data routing method according to an embodiment of this application.

FIG. 6 is a first schematic flowchart of a data routing method according to an embodiment of this application. As shown in FIG. 6, the method includes the following steps:

Step 600: A boundary node receives a packet in a first topology.

Step 610: The boundary node determines ownership of a destination node of the packet based on first information in a header of the packet.

Step 620: In a case that the destination node of the packet belongs to a second topology, the boundary node re-writes the header of the packet based on the first information.

Step 630: The boundary node transmits a re-written packet to the destination node in the second topology.

Optionally, the packet in the first topology is generated by a generation node in the first topology.

Optionally, the header of the packet in the first topology includes the first information, and the first information may be used by the boundary node to determine the ownership of the destination node of the packet, that is, used by the boundary node to determine whether the destination node of the packet belongs to the second topology. In other words, the first information may be used by the boundary node to distinguish whether the packet needs to be delivered to an upper layer of the boundary node or whether header re-writing (BAP header re-writing) needs to be performed at the boundary node.

Optionally, after receiving the packet in the first topology, the boundary node may determine, based on the first information in the header of the packet, whether the destination node of the packet belongs to the second topology, that is, determine whether the packet needs to be delivered to an upper layer of the boundary node or whether header re-writing needs to be performed at the boundary node.

Optionally, in a case that the boundary node determines that the destination node of the packet belongs to the second topology, the boundary node may re-write the header of the packet based on the first information, and transmit the re-written packet to the destination node in the second topology, so that the packet can be effectively transmitted in the second topology.

Optionally, a destination IAB node is the destination node.

Optionally, re-writing (re-writing) of the header of the packer may also be referred to as overwriting of the header of the packer.

This embodiment of this application provides a data routing method in a topology redundancy scene. In a case that the boundary node determines that the destination node of the packet belongs to the second topology, the boundary node may perform routing ID re-writing (re-writing) on a BAP header of the packet in the first topology to change into a routing ID in the second topology, so that the packet can be routed by the boundary node from the first topology to the second topology, thereby implementing load-balancing in inter-donor redundancy.

In this embodiment of this application, a boundary node determines, based on first information in a header of a packet in a first topology, whether a destination node of the packet belongs to a second topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, the determining, by the boundary node, ownership of a destination node of the packet based on first information in a header of the packet includes:

in a case that the boundary node determines that a backhaul adaptation protocol BAP destination address in the first information is the same as a first BAP virtual address of the boundary node, determining that the destination node of the packet belongs to the second topology, where there is a mapping relationship between the first BAP virtual address and a first destination node information group of the packet, the first destination node information group includes a first destination address and a first path ID of the destination node in the second topology, and the first path ID is used to indicate a routing path from the boundary node to the destination node in the second topology.

Optionally, in this embodiment of this application, the boundary node may determine the ownership of the destination node of the packet according to a backhaul adaptation protocol destination address (destination BAP address, which may also be referred to as a BAP destination address) in the first information, that is, determine whether header re-writing needs to be performed.

Optionally, the boundary node may match the BAP destination address in the first information with an address of the boundary node. If it is found that the BAP destination address in the first information is the same as a first virtual address of the boundary node, it may be determined that the destination node of the packet belongs to the second topology, that is, header re-writing needs to be performed.

Optionally, the first BAP virtual address may be a preset virtual address.

Optionally, the first BAP virtual address may correspond to the first destination node information group.

Optionally, a correspondence between the first BAP virtual address and the first destination node information group may be preset.

Optionally, the boundary node may be mapped to the first destination node information group based on the first BAP virtual address, to determine the first destination address and the first path ID of the destination node in the second topology, that is, the routing path from the boundary node to the destination node in the second topology.

Optionally, after the generation node (Donor-DU or access node) in the first topology generates a BAP PDU for data that requires inter-donor routing, when the BAP PDU is routed to the boundary node, the boundary node may determine, according to whether a BAP destination address carried in the BAP PDU is the same as the first BAP virtual address, whether cross-topology routing needs to be performed for the packet, and if yes, further determine a BAP routing ID corresponding to the PDU in the second topology based on the BAP destination address carried in the BAP PDU, and re-write the BAP routing ID into a header of the BAP PDU for transmission in the second topology.

Optionally, in this embodiment of this application, the first information in the BAP header of the PDU on which inter-donor routing is performed may include a destination BAP address, and the destination BAP address may be the same as the first virtual address.

Optionally, in this embodiment of this application, the boundary node may perform BAP header re-writing according to the first BAP virtual address (first logical/virtual BAP address). That is, a path ID is replaced with a BAP address, thereby effectively reducing complexity of packet routing and saving transmission resources.

Optionally, the re-writing, by the boundary node, the header of the packet based on the first information includes:

determining, by the boundary node based on a local second mapping table and the first BAP virtual address, the first destination node information group that has the mapping relationship with the first BAP virtual address; and re-writing the header of the packet based on the first destination address and the first path ID in the second topology in the first destination node information group, where the second mapping table includes at least one second BAP virtual address and at least one second destination node information group, there is a mapping relationship between one second BAP virtual address and one or more second destination node information groups, there is a mapping relationship between different second BAP virtual addresses and different second destination node information groups, the first BAP virtual address is one of the at least one second BAP virtual address, and the first destination node information group is one of the at least one second destination node information group; and the at least one second BAP virtual address is configured for the boundary node by a first centralized unit CU in the first topology or a second centralized unit CU in the second topology.

Optionally, the CU in the first topology and/or the CU in the second topology may configure a plurality of logical/virtual BAP addresses for the boundary node, that is, second BAP virtual addresses, where each second BAP virtual address corresponds to one second destination node information group (Destination BAP address, Path ID) in the second topology.

Optionally, the at least one second BAP virtual address, the corresponding one or more second destination node information groups, and the mapping relationship between the two may be reflected in the second mapping table.

The second mapping table includes at least one second BAP virtual address, and each second BAP virtual address may correspond to one or more second destination node information groups.

Optionally, the second mapping table may be preset, and is locally stored by the boundary node.

Optionally, in a case that the BAP destination address carried in the BAP PDU is the same as the first BAP virtual address, after determining that cross-topology routing needs to be performed for the packet, the boundary node may determine, based on the BAP destination address carried in the BAP PDU, the BAP routing ID corresponding to the PDU in the second topology, that is, the boundary node may find, based on the second mapping table locally stored by the boundary node, the first destination node information group corresponding to the first BAP virtual address, and further determine, based on the first destination node information group, the first destination address and the first path ID that are corresponding to the first BAP virtual address in the second topology, and re-write the two IDs into the BAP header of the packet.

Optionally, the boundary node may re-find, according to a legacy routing rule, a next-hop node for the BAP PDU whose header is re-written to submit data, until the data is routed to the destination node displayed in the BAP header.

Optionally, a definition of the second mapping table may include at least one of the following:

generation objects of the second mapping table: a CU in the first topology and/or a CU in the second topology.

The second mapping table may be shown in the following Table 1, and includes at least one of the following:

a second BAP virtual address of the boundary node;

a path ID corresponding to the second BAP virtual address of the boundary node in the second topology; and a BAP address of a destination IAB node corresponding to the second BAP virtual address of the boundary node in the second topology, where the path ID corresponding to the second virtual/logical BAP address of the boundary node in the second topology and the BAP address of the destination IAB node corresponding to the second virtual/logical BAP address of the boundary node in the second topology may be referred to as a second destination node information group.

TABLE 1

| Second mapping table | | |
|---|---|---|
| Second BAP virtual address | BAP address of the destination IAB node in the second topology | path ID from the boundary node to the destination IAB node in the second topology |
| B4 (IAB3) | A5 (IAB5) | Py |
| C4 (IAB3) | A4 (IAB4) | Pz |

Table 1 is only an example of the second mapping table, and is not used as a limitation on the second mapping table and content thereof.

Optionally, the BAP address of the destination IAB node is a destination address of the destination node.

Optionally, a real BAP address of the boundary node is a real address of the boundary node.

Optionally, for an uplink, the boundary node may maintain a set of second mapping tables, and for a downlink, the boundary node may maintain another set of same or different second mapping tables. The generation node may maintain a first mapping table corresponding to the boundary node, so that the first information in the header of the packet generated by the generation node may be accurately indicated.

Optionally, the determining, by the boundary node, ownership of a destination node of the packet based on first information in a header of the packet further includes:

in a case that the boundary node determines that the BAP destination address in the first information is the same as a real address of the boundary node, determining that the destination node of the packet is the boundary node; and the method further includes:

removing the header of the packet; and delivering the packet after the removal of the header to an upper layer of a BAP layer of the boundary node.

Optionally, after receiving the packet (BAP PDU), the boundary node may determine whether a BAP destination address in the BAP header is an address of the boundary node. If no, the data is submitted to a next hop (next IAB node) according to legacy behavior. If yes, it may be further determined whether the BAP address is a virtual address or a real address of the boundary node.

Optionally, if the boundary node determines that the BAP destination address in the first information is the same as the real address of the boundary node, that is, determines that the BAP destination address in the BAP header is the real address of the boundary node, it indicates that the data is transmitted to the boundary node instead of being routed to another topology, and the PDU may be delivered to the upper layer of the BAP layer of the boundary node after the header is removed.

Optionally, the determining, by the boundary node, ownership of a destination node of the packet based on first information in a header of the packet includes:

in a case that the boundary node determines that a BAP destination address in the first information is the same as a real address of the boundary node and the first information includes first indication information, determining that the destination node of the packet belongs to the second topology, where the first indication information is used to directly indicate that cross-topology routing needs to be performed for the packet.

Optionally, in this embodiment of this application, 1 bit (that is, the first indication information) may be used in the header to indicate that the PDU is a packet that requires cross-topology routing (to-be-routed packet), and a path ID in the second topology is carried.

Optionally, in this embodiment of this application, the boundary node may determine the ownership of the destination node of the packet according to the first indication information in the first information, that is, determine whether header re-writing (header re-writing) needs to be performed.

Optionally, the first indication information is used to directly indicate that the destination node of the packet belongs to the second topology, that is, when determining that the first information includes the first indication information, the boundary node may directly determine that the destination node of the packet belongs to the second topology, that is, header re-writing needs to be performed.

Optionally, after the generation node (Donor-DU or access node) in the first topology generates a BAP PDU for data that requires inter-donor routing, when the BAP PDU is routed to the boundary node, the boundary node determines, according to the first indication information carried in the BAP PDU, that header re-writing needs to be performed for the PDU, determines a BAP routing ID corresponding to the packet in the second topology, and rewrites the BAP routing ID into a header of the BAP PDU for transmission in the second topology.

Optionally, in this embodiment of this application, the operation in which the generation node (donor-DU or access node) of the packet configures the BAP routing ID for data that requires cross-topology routing (to-be-routed data) is omitted, thereby effectively reducing complexity of packet routing and saving transmission resources.

Optionally, the first information further includes a second path ID, and the second path ID is used to indicate a routing path from the boundary node to the destination node in the second topology.

Figure 7:
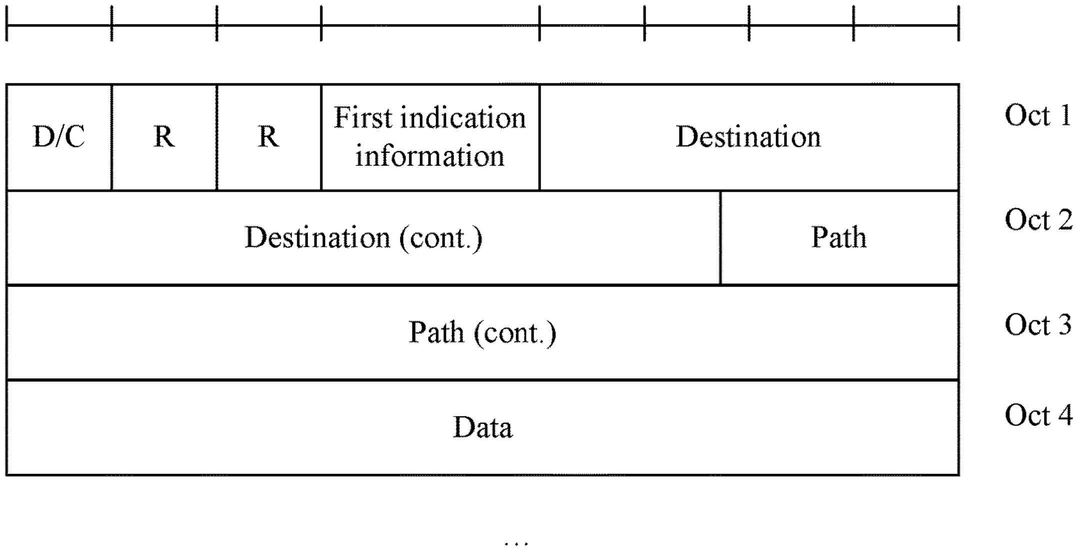
FIG. 7 is a schematic diagram of a BAP Data PDU format according to an embodiment of this application.

Optionally, FIG. 7 is a schematic diagram of a BAP Data PDU format according to an embodiment of this application. As shown in FIG. 7, the first information in the BAP header of the PDU on which inter-donor routing is performed may further include the following information:

(1) the destination BAP address: the real BAP address of the boundary node in the first topology;

(2) the second path ID: a path ID from the boundary node to the destination node in the second topology; and (3) the first indication information, which used to indicate that packet header re-writing (BAP header re-writing) needs to be performed for the PDU, that is, cross-topology routing needs to be performed. 1 bit in the header of the packet (BAP header) may be used for indication, for example, an Rbit (for example, a third Rbit), and 0 indicates that BAP header re-writing needs to be performed. Correspondingly, if BAP header re-writing does not need to be performed, the bit may be 1, that is, second indication information.

Optionally, the re-writing, by the boundary node, the header of the packet based on the first information includes:

determining, by the boundary node, a second destination address of the destination node in the second topology based on a local third mapping table and the second path ID; and re-writing the header of the packet based on the second path ID and the second destination address, where the third mapping table includes at least one third path ID and at least one third destination address, there is a mapping relationship between one third path ID and one or more third destination addresses, there is a mapping relationship between different third path IDs and different third destination addresses, the second path ID is one of the at least one third path ID, and the second destination address is one of the at least one third destination address.

Optionally, after determining, according to the first indication information carried in the BAP PDU, that cross-topology routing needs to be performed for the packet, the boundary node may determine, based on the second path ID and the third mapping table in the first information, the second destination address that has the mapping relationship with the second path ID in the third mapping table, and may further re-write the two IDs into the BAP header of the PDU.

Optionally, the boundary node may re-find, according to a legacy routing rule, a next-hop node for the BAP PDU whose header is re-written to submit data, until the data is routed to the destination node displayed in the BAP header.

Optionally, after receiving the BAP PDU, another IAB node in the first topology may determine whether the first indication information indicates that cross-topology routing (BAP header re-writing) needs to be performed for the PDU. If the first indication information indicates that cross-topology routing needs to be performed, the data is routed only according to the BAP destination address. If there is no indication of the first indication information or the second indication information indicates that cross-topology routing does not need to be performed, the data is routed according to the legacy routing rule.

Optionally, content of the third mapping table may include at least one of the following:

(1) the second path ID;

(2) the destination address corresponding to the path ID; and (3) an IAB address of a next-hop node.

Optionally, the third mapping table includes at least one third path ID and at least one third destination address.

Optionally, each third path ID may correspond to one or more third destination addresses.

Optionally, when determining, based on the second path ID and the third mapping table in the first information, that the second destination address that has the mapping relationship with the second path ID in the third mapping table, the boundary node may find, in the third mapping table, the third path ID that is the same as the second path ID, and then determine that the third destination address corresponding to the third path ID is the second destination address of the destination node corresponding to the second path ID in the second topology, that is, the second destination address of the destination node of the packet.

Optionally, for an uplink, the boundary node may maintain a set of third mapping tables, and for a downlink, the boundary node may maintain another set of same or different third mapping tables.

Optionally, the determining, by the boundary node, ownership of a destination node of the packet based on first information in a header of the packet further includes:

in a case that the boundary node determines that the BAP destination address in the first information is the same as the real address of the boundary node and the first information includes second indication information, determining that the destination node of the packet is the boundary node, where the second indication information is used to directly indicate that cross-topology routing does not need to be performed for the packet; and the method further includes:

removing the header of the packet; and delivering the packet after the removal of the header to an upper layer of a BAP layer of the boundary node.

Optionally, after receiving the BAP PDU, the boundary node may determine whether a BAP destination address in the BAP header is an address of the boundary node. If no, the data is submitted to a next hop (a next IAB node) according to legacy behavior. If yes, it may be further determined whether the first indication information indicates that cross-topology routing needs to be performed.

Optionally, if the second indication information indicates that cross-topology routing does not need to be performed, it may indicate that the data is transmitted to the boundary node instead of being routed to another topology, and the PDU may be delivered to the upper layer of the BAP layer of the boundary node after the header is removed.

Optionally, in a case that the first information includes the second indication information, the first information may further include a sixth path ID, and the sixth path ID is a routing path from a generation node of the packet to the boundary node in the first topology.

Optionally, the determining, by the boundary node, ownership of a destination node of the packet based on first information in a header of the packet includes:

in a case that the boundary node determines that a backhaul adaptation protocol BAP destination address in the first information is the same as a third BAP virtual address of the boundary node, determining that the destination node of the packet belongs to the second topology, where the third BAP virtual address is used to indicate that cross-topology routing needs to be performed for the packet, and the third BAP virtual address is configured for the boundary node by a first centralized unit CU in the first topology or a second centralized unit CU in the second topology.

Optionally, in this embodiment of this application, a virtual address of the boundary node may be used to indicate that the PDU is a to-be-routed packet.

Optionally, the third BAP virtual address may be used to directly indicate that cross-topology routing needs to be performed for the packet, that is, when determining that the first information includes the third BAP virtual address (the BAP destination address in the first information is the same as the third BAP virtual address of the boundary node), the boundary node may directly determine that the destination node of the packet belongs to the second topology, that is, header re-writing needs to be performed.

Optionally, after the generation node (Donor-DU or access node) in the first topology generates a BAP PDU for data that requires inter-donor routing, when the BAP PDU is routed to the boundary node, the boundary node determines, according to a third BAP virtual address carried in the BAP PDU, that header re-writing needs to be performed for the PDU, determines a BAP routing ID corresponding to the PDU in the second topology, and rewrites the BAP routing ID into a header of the BAP PDU for transmission in the second topology.

Optionally, the third BAP virtual address may be a preset virtual address, and is used to directly indicate that header re-writing needs to be performed for the packet.

Optionally, the third BAP virtual address is configured for the boundary node by the first centralized unit CU in the first topology or the second centralized unit CU in the second topology. That is, the CU in the first topology and/or the CU in the second topology may configure one logical/virtual BAP address for the boundary node, to directly indicate that cross-topology routing needs to be performed for the packet.

Optionally, each boundary node (boundary node) may have a fixed third BAP virtual address.

Optionally, each boundary node may have two fixed third BAP virtual addresses, one for routing of uplink data and the other for routing of downlink data.

Optionally, the first information further includes a fourth path ID, and the fourth path ID is used to indicate a routing path from the boundary node to the destination node in the second topology; and the re-writing, by the boundary node, the header of the packet based on the first information includes:

determining a fourth destination address of the destination node in the second topology based on a local fourth mapping table and the fourth path ID; and re-writing the header of the packet based on the fourth path ID and the fourth destination address, where the fourth mapping table includes at least one fifth path ID and at least one fifth destination address, there is a mapping relationship between one fifth path ID and one or more fifth destination addresses, there is a mapping relationship between different fifth path IDs and different fifth destination addresses, the fourth path ID is one of the at least one fifth path ID, and the fourth destination address is one of the at least one fifth destination address.

Optionally, in a case that the boundary node determines that the BAP destination address in the first information is the same as the third BAP virtual address of the boundary node, the first information may further include a fourth path ID, and the fourth path ID is used to indicate a routing path from the boundary node to the destination node in the second topology.

Optionally, after determining, according to the third BAP virtual address carried in the BAP PDU, that header re-writing needs to be performed for the PDU, the boundary node may find, based on the local fourth mapping table, the fifth path ID that is in the at least one fifth path ID and that is the same as the fourth path ID, the fifth destination address corresponding to the fifth path ID that is the same as the fourth path ID, that is, the fourth destination address corresponding to the fourth path ID. In this case, the fourth destination address of the destination node in the second topology may be determined, and further the two IDs may be re-written into the BAP header of the packet.

Optionally, the BAP header of the PDU on which inter-donor routing is performed may carry the following information:

(1) the destination BAP address: the third BAP virtual address of the boundary node; and (2) the fourth path ID: a path ID from the boundary node to the destination IAB in the second topology.

Optionally, if the BAP destination address is a logical address of the boundary node, the fifth path ID that is the same as the fourth path ID is found according to the fourth mapping table at the boundary node (the fourth path ID corresponds to the second topology, and corresponds to an address of a real destination node to which the PDU ultimately needs to be transmitted, that is, the fourth destination address), and further the fifth destination address corresponding to the fifth path ID may be determined, that is, the BAP destination address corresponding to the fourth path ID, and the two IDs may be re-written into the BAP header of the PDU.

Optionally, the boundary node may re-find, according to a legacy routing rule, a next-hop node for the BAP PDU whose header is re-written to submit data, until the data is routed to the destination node displayed in the BAP header.

Optionally, content of the fourth mapping table may include at least one of the following:

the fifth path ID in the second topology;

the fifth destination address corresponding to the fifth path ID; and an IAB address of a next-hop node.

Optionally, for an uplink, the boundary node may maintain a set of fourth mapping tables, and for a downlink, the boundary node may maintain another set of same or different fourth mapping tables.

Optionally, the determining, by the boundary node, ownership of a destination node of the packet based on first information in a header of the packet includes:

in a case that the boundary node determines that the BAP destination address in the first information is the same as a real address of the boundary node, determining that the destination node of the packet is the boundary node; and the method further includes:

removing the header of the packet; and delivering the packet after the removal of the header to an upper layer of a BAP layer of the boundary node.

Optionally, after receiving the BAP PDU, the boundary node may determine whether a BAP destination address in the BAP header is an address of the boundary node. If no, the data is submitted to a next hop (a next IAB node) according to legacy behavior. If yes, it may be further determined whether the BAP address is a virtual address or a real address of the boundary node.

Optionally, if the boundary node determines that the BAP destination address in the first information is the same as the real address of the boundary node, that is, determines that the BAP destination address in the BAP header is the real address of the boundary node, it indicates that the data packet is transmitted to the boundary node instead of being routed to another topology, and the PDU may be delivered to the upper layer of the BAP layer of the boundary node after the header is removed.

Optionally, the first information further includes a seventh path ID, and the seventh path ID is used to indicate a routing path from a generation node of the packet to the boundary node in the first topology.

Optionally, in a case that the destination node of the packet is the boundary node, the first information further includes a seventh path ID, and the seventh path ID is used to indicate a routing path from a generation node of the packet to the boundary node in the first topology.

Optionally, the determining, by the boundary node, ownership of a destination node of the packet based on first information in a header of the packet further includes:

in a case that the boundary node determines that the BAP destination address in the first information is different from all addresses of the boundary node, determining that the destination node of the packet does not belong to the second topology; and the method further includes:

transmitting the packet according to a routing rule specified in a protocol.

Optionally, after receiving the BAP PDU, the boundary node may determine whether a BAP destination address in the BAP header is an address of the boundary node. If no, the boundary node determines that the BAP destination address in the first information is different from all addresses of the boundary node, and the data may be submitted to a next hop (a next IAB node) according to legacy behavior.

Optionally, the routing rule specified in the protocol may be an existing legacy routing rule, or may be a routing rule specified in a communication protocol.

Optionally, this embodiment of this application provides a data routing method in a topology redundancy scene. The boundary node performs, according to a preset mapping rule, routing ID re-writing (re-writing) on a packet BAP header in a topology 1 to change into a routing ID in a topology 2, so that the packet can be routed by the boundary node from the topology 1 to the topology 2, thereby implementing load-balancing in inter-donor redundancy. The boundary node does not need to maintain an additional (and complex) mapping table, but follows a table in a legacy technology. Therefore, a quantity of available path IDs in the topology 1 is not reduced, and only a small quantity of BAP address needs to be occupied.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Figure 8:
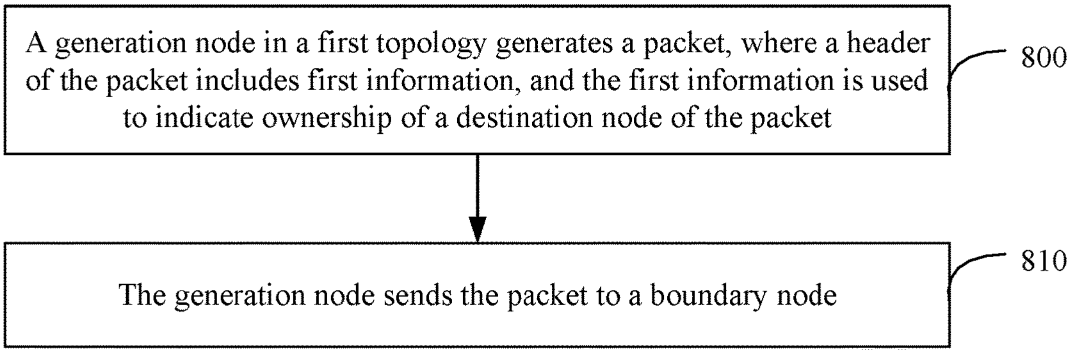
FIG. 8 is a second schematic flowchart of a data routing method according to an embodiment of this application.

FIG. 8 is a second schematic flowchart of a data routing method according to an embodiment of this application. As shown in FIG. 8, the method includes the following steps:

Step 800: A generation node in a first topology generates a packet, where a header of the packet includes first information, and the first information is used to indicate ownership of a destination node of the packet.

Step 810: The generation node sends the packet to a boundary node.

Optionally, the packet in the first topology is generated by the generation node in the first topology.

Optionally, the header of the packet in the first topology includes the first information, and the first information may be used by the boundary node to determine the ownership of the destination node of the packet, that is, used by the boundary node to distinguish whether the packet needs to be delivered to an upper layer of the boundary node or whether header re-writing (BAP header re-writing) needs to be performed at the boundary node.

Optionally, the ownership of the destination node of the packet is known to the generation node.

Optionally, after receiving the packet in the first topology, the boundary node may determine the ownership of the destination node of the packet based on the first information in the header of the packet, that is, determine whether the packet needs to be delivered to an upper layer of the boundary node or whether header re-writing needs to be performed at the boundary node.

Optionally, in a case that the boundary node determines that the destination node of the packet belongs to the second topology, the boundary node may re-write the header of the packet based on the first information, and transmit the re-written packet to the destination node in the second topology, so that the packet can be effectively transmitted in the second topology.

This embodiment of this application provides a data routing method in a topology redundancy scene. In a case that the boundary node determines that the destination node of the packet belongs to the second topology, the boundary node may perform routing ID re-writing (re-writing) on a BAP header of the packet in the first topology to change into a routing ID in the second topology, so that the packet can be routed by the boundary node from the first topology to the second topology, thereby implementing load-balancing in inter-donor redundancy.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, before the generating, by a generation node in a first topology, a packet, the method further includes:

determining, by the generation node, a first destination address of the packet on the destination node in the second topology;

determining, by the generation node, a first path ID based on the first destination address, where the first path ID is used to indicate a routing path from the boundary node to the destination node in the second topology; and determining, by the generation node, a first BAP virtual address in the first information based on a local first mapping table and first mapping information; and the generating, by a generation node in a first topology, a packet includes:

generating, by the generation node, the packet, where a BAP destination address in the first information in the header of the packet is the same as the first BAP virtual address, where the first mapping information includes any one or any combination of the following:

a real address of the boundary node;

the first destination address; and the first path ID, where the first mapping table includes at least one fourth BAP virtual address and at least one piece of second mapping information, there is a mapping relationship between one piece of second mapping information and one fourth BAP virtual address, there is a mapping relationship between different second mapping information and different fourth BAP virtual addresses, the first BAP virtual address is one of the at least one fourth BAP virtual address, and the first mapping information is one of the at least one piece of second mapping information; and the at least one fourth BAP virtual address is configured for the boundary node by a first centralized unit CU in the first topology or a second centralized unit CU in the second topology.

Optionally, the generation node locally stores one first mapping table, and the first mapping table is used to determine at least one first BAP virtual address of the boundary node.

Optionally, the generation node may first determine the first destination address of the packet at the destination node in the second topology, and then determine the first path ID based on the first destination address, where the first path ID is used to indicate a path ID from the boundary node to the destination node in the second topology; and determine the boundary node that needs to re-write the header of the packet.

Optionally, the first BAP virtual address corresponding to the first mapping information may be determined in the first mapping table based on the local first mapping information, and the first mapping information may include any one or any combination of the following:

a real address of the boundary node;

the first destination address; and the first path ID.

Optionally, for example, the first mapping information includes the real address of the boundary node and the first path ID. The generation node may first determine the first destination address of the packet at the destination node in the second topology, and then determine the first path ID based on the first destination address, where the first path ID is used to indicate a path ID from the boundary node to the destination node in the second topology; and determine the boundary node that needs to re-write the header of the packet. That is, at least one eighth path ID corresponding to the real address of the boundary node may be determined in the first mapping table, and an eighth path ID that is the same as the first path ID may be determined. Further, a fourth BAP virtual address corresponding to the eighth path ID that is the same as the first path ID is determined as the first BAP virtual address that has the mapping relationship with the first path ID, that is, the BAP destination address in the first information in the header of the packet may be set to be the same as the first BAP virtual address.

Optionally, the mapping relationship that is between the mapping information in the first mapping table and the fourth BAP virtual address and that is locally stored by the generation node is the same as the mapping relationship that is between the second BAP virtual address in the second mapping table and the second destination node information group and that is locally stored by the boundary node.

Optionally, generation objects of the first mapping table are a CU in the first topology and/or a CU in the second topology.

Optionally, the first mapping table may be shown in the following Table 2, and include at least one of the following:

(i) a real BAP address of the boundary node in the first topology;

(ii) a BAP address of a destination IAB node in the second topology;

(iii) a path ID from the boundary node to the destination IAB node in the second topology; and (iv) a fourth BAP virtual address of any one or any combination of the foregoing (i) to (iii) corresponding to the boundary node.

TABLE 2

| First mapping table | | | |
|---|---|---|---|
| Real BAP address of the boundary node | BAP address of the destination IAB node in the second topology | path ID from the boundary node to the destination IAB node in the second topology | Fourth BAP virtual address |
| A4 (IAB3) | A5 (IAB5) | Py | B4 (IAB3) |
| A4 (IAB3) | A4 (IAB4) | Pz | C4 (IAB3) |

Table 2 is only an example of the first mapping table, and is not used as a limitation on the first mapping table and content thereof. Optionally, in a case that the destination node of the packet is the boundary node, the generating, by a generation node in a first topology, a packet includes:

generating, by the generation node, the packet, where the BAP destination address in the first information in the header of the packet is the same as the real address of the boundary node.

Optionally, in a case that the destination node of the packet is the boundary node, the real address of the boundary node may be directly used as the BAP destination address in the first information in the header of the packet generated by the generation node.

Optionally, after receiving the BAP PDU, the boundary node may determine whether a BAP destination address in the BAP header is an address of the boundary node. If no, the data is submitted to a next hop (a next IAB node) according to legacy behavior. If yes, it may be further determined whether the BAP address is a virtual address or a real address of the boundary node.

Optionally, if the boundary node determines that the BAP destination address in the first information is the same as the real address of the boundary node, that is, determines that the BAP destination address in the BAP header is the real address of the boundary node, it indicates that the data is transmitted to the boundary node instead of being routed to another topology, and the PDU may be delivered to the upper layer of the BAP layer of the boundary node after the header is removed.

Optionally, in a case that the destination node of the packet belongs to a second topology, the generating, by a generation node in a first topology, a packet includes:

generating, by the generation node, the packet, where a BAP destination address in the first information in the header of the packet is the same as a real address of the boundary node, the first information includes first indication information, and the first indication information is used to directly indicate that cross-topology routing needs to be performed for the packet.

Optionally, in this embodiment of this application, 1 bit (that is, the first indication information) may be used in the BAP header to indicate that the PDU is a to-be-routed packet, and a path ID in the second topology is carried.

Optionally, in a case that the destination node of the packet belongs to the second topology, the BAP destination address in the first information in the header of the packet that may be generated by the generation node is the same as the real address of the boundary node, and the first information includes the first indication information, which is used to directly indicate the boundary node that cross-topology routing needs to be performed for the packet.

Optionally, in this embodiment of this application, the boundary node may determine the ownership of the destination node of the packet according to the first indication information in the first information, that is, determine whether header re-writing needs to be performed.

Optionally, the first indication information is used to directly indicate that the destination node of the packet belongs to the second topology, that is, when determining that the first information includes the first indication information, the boundary node may directly determine that the destination node of the packet belongs to the second topology, that is, header re-writing needs to be performed.

Optionally, after the generation node (Donor-DU or access node) in the first topology generates a BAP PDU for data that requires inter-donor routing, when the BAP PDU is routed to the boundary node, the boundary node determines, according to the first indication information carried in the BAP PDU, that header re-writing needs to be performed for the PDU, determines a BAP routing ID corresponding to the packet in the second topology, and rewrites the BAP routing ID into a header of the BAP PDU for transmission in the second topology.

Optionally, in this embodiment of this application, the operation in which the donor-DU/access node configures the BAP routing ID of the to-be-routed data is omitted, thereby effectively reducing complexity of packet routing and saving transmission resources.

Optionally, the first information further includes a second path ID, and the second path ID is used to indicate a routing path from the boundary node to the destination node in the second topology.

Optionally, in a case that the destination node of the packet belongs to the second topology, the BAP destination address in the first information in the header of the packet that may be generated by the generation node is the same as the real address of the boundary node, and when the first information includes the first indication information, the first information may further include a second path ID, where the second path ID is used to indicate a routing path from the boundary node to the destination node in the second topology.

Optionally, in a case that the destination node of the packet is the boundary node, the generating, by a generation node in a first topology, a packet includes:

generating, by the generation node, the packet, where the BAP destination address in the first information in the header of the packet is the same as the real address of the boundary node, the first information includes second indication information, and the second indication information is used to directly indicate that cross-topology routing does not need to be performed for the packet.

Optionally, in a case that the destination node of the packet is the boundary node, the BAP destination address in the first information in the header of the packet that may be generated by the generation node is the same as the real address of the boundary node, and the first information includes the second indication information, which is used to directly indicate the boundary node that cross-topology routing does not need to be performed for the packet.

Optionally, after receiving the BAP PDU, the boundary node may determine whether a BAP destination address in the BAP header is an address of the boundary node. If no, the data is submitted to a next hop (a next IAB node) according to legacy behavior. If yes, it may be further determined whether the first indication information indicates that cross-topology routing needs to be performed.

Optionally, if the second indication information indicates that cross-topology routing does not need to be performed, it may indicate that the data is transmitted to the boundary node instead of being routed to another topology, and the PDU may be delivered to the upper layer of the BAP layer of the boundary node after the header is removed.

Optionally, in a case that the destination node of the packet belongs to a second topology, the generating, by a generation node in a first topology, a packet includes:

generating, by the generation node, the packet, where a BAP destination address in the first information in the header of the packet is the same as a third BAP virtual address, and the third BAP virtual address is used to indicate that cross-topology routing needs to be performed for the packet; and the third BAP virtual address is configured for the boundary node by a first centralized unit CU in the first topology or a second centralized unit CU in the second topology.

Optionally, in this embodiment of this application, a virtual address of the boundary node may be used to indicate that the PDU is a to-be-routed packet.

Optionally, in a case that the destination node of the packet belongs to the second topology, the BAP destination address in the first information in the header of the packet generated by the generation node may be the same as the third BAP virtual address.

Optionally, after the generation node (Donor-DU or access node) in the first topology generates a BAP PDU for data that requires inter-donor routing, when the BAP PDU is routed to the boundary node, the boundary node determines, according to a third BAP virtual address carried in the BAP PDU, that header re-writing needs to be performed for the PDU, determines a BAP routing ID corresponding to the PDU in the second topology, and rewrites the BAP routing ID into a header of the BAP PDU for transmission in the second topology. Optionally, the third BAP virtual address is configured for the boundary node by the first centralized unit CU in the first topology or the second centralized unit CU in the second topology. That is, the CU in the first topology and/or the second topology may configure one logical/virtual BAP address for the boundary node, to directly indicate that cross-topology routing needs to be performed for the packet.

Optionally, each boundary node may have a fixed third BAP virtual address.

Optionally, each boundary node may have two fixed third BAP virtual addresses, one for routing of uplink data and the other for routing of downlink data.

Optionally, the first information further includes a fourth path ID, and the fourth path ID is used to indicate a routing path from the boundary node to the destination node in the second topology.

Optionally, in a case that the boundary node determines that the BAP destination address in the first information is the same as the third BAP virtual address of the boundary node, the first information may further include a fourth path ID, and the fourth path ID is used to indicate a routing path from the boundary node to the destination node in the second topology.

Optionally, in a case that the destination node of the packet is the boundary node, the generating, by a generation node in a first topology, a packet includes:

generating, by the generation node, the packet, where the BAP destination address in the first information in the header of the packet is the same as a real address of the boundary node.

Optionally, in a case that the destination node of the packet is the boundary node, the BAP destination address in the first information in the header of the packet that may be generated by the generation node is the same as the real address of the boundary node, and the first information includes the third BAP virtual address, which is used to directly indicate the boundary node that cross-topology routing does not need to be performed for the packet.

Optionally, after receiving the BAP PDU, the boundary node may determine whether a BAP destination address in the BAP header is an address of the boundary node. If no, the data is submitted to a next hop (a next IAB node) according to legacy behavior. If yes, it may be further determined whether the BAP address is a virtual address or a real address of the boundary node.

Optionally, if the boundary node determines that the BAP destination address in the first information is the same as the real address of the boundary node, that is, determines that the BAP destination address in the BAP header is the real address of the boundary node, it indicates that the data packet is transmitted to the boundary node instead of being routed to another topology, and the PDU may be delivered to the upper layer of the BAP layer of the boundary node after the header is removed.

Optionally, in a case that the destination node of the packet does not belong to the second topology, the generating, by a generation node in a first topology, a packet includes:

generating, by the generation node, the packet, where the BAP destination address in the first information in the header of the packet is different from all addresses of the boundary node.

Optionally, in a case that the destination node of the packet does not belong to the second topology, the BAP destination address in the first information in the header of the packet generated by the generation node is different from all addresses of the boundary node.

Optionally, after receiving the BAP PDU, the boundary node may determine whether a BAP destination address in the BAP header is an address of the boundary node. If no, the boundary node determines that the BAP destination address in the first information is different from all addresses of the boundary node, and the data may be submitted to a next hop (a next IAB node) according to legacy behavior.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

It should be noted that the data routing method provided in the embodiments of this application may be performed by a data routing apparatus, or a control module that is in the data routing apparatus and that is configured to perform the data routing method. In the embodiments of this application, an example in which the data routing apparatus performs the data routing method is used to describe the data routing apparatus provided in the embodiments of this application.

Figure 9:
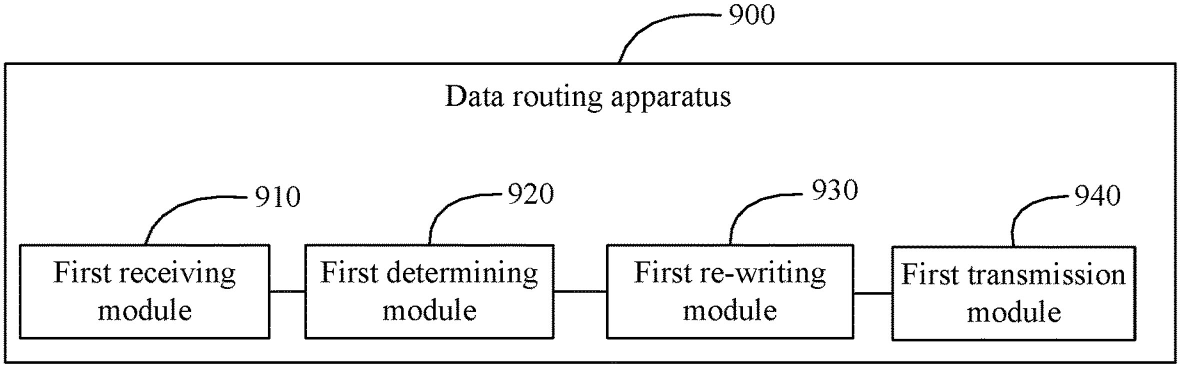
FIG. 9 is a first schematic structural diagram of a data routing apparatus according to an embodiment of this application.

FIG. 9 is a first schematic structural diagram of a data routing apparatus according to an embodiment of this application. As shown in FIG. 9, the data routing apparatus 900 includes a first receiving module 910, a first determining module 920, a first re-writing module 930, and a first transmission module 940.

The first receiving module 910 is configured to receive a packet in a first topology.

The first determining module 920 is configured to determine ownership of a destination node of the packet based on first information in a header of the packet.

The first re-writing module 930 is configured to: in a case that the destination node of the packet belongs to a second topology, re-write the header of the packet based on the first information.

The first transmission module 940 is configured to transmit a re-written packet to the destination node in the second topology.

Optionally, the data routing apparatus may receive a packet in a first topology by using the first receiving module 910; determine ownership of a destination node of the packet based on first information in a header of the packet by using the first determining module 920; in a case that the destination node of the packet belongs to a second topology, re-write the header of the packet based on the first information by using the first re-writing module 930; and then transmit a re-written packet to the destination node in the second topology by using the first transmission module 940.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, the first determining module is further configured to:

in a case that the boundary node determines that a backhaul adaptation protocol BAP destination address in the first information is the same as a first BAP virtual address of the boundary node, determine that the destination node of the packet belongs to the second topology, where there is a mapping relationship between the first BAP virtual address and a first destination node information group of the packet, the first destination node information group includes a first destination address and a first path ID of the destination node in the second topology, and the first path ID is used to indicate a routing path from the boundary node to the destination node in the second topology.

Optionally, the first re-writing module is further configured to:

determine, based on a local second mapping table and the first BAP virtual address, the first destination node information group that has the mapping relationship with the first BAP virtual address; and re-write the header of the packet based on the first destination address and the first path ID in the second topology in the first destination node information group, where the second mapping table includes at least one second BAP virtual address and at least one second destination node information group, there is a mapping relationship between one second BAP virtual address and one or more second destination node information groups, there is a mapping relationship between different second BAP virtual addresses and different second destination node information groups, the first BAP virtual address is one of the at least one second BAP virtual address, and the first destination node information group is one of the at least one second destination node information group; and the at least one second BAP virtual address is configured for the boundary node by a first centralized unit CU in the first topology or a second centralized unit CU in the second topology.

Optionally, the first determining module is further configured to:

in a case that the boundary node determines that the BAP destination address in the first information is the same as a real address of the boundary node, determine that the destination node of the packet is the boundary node; and the apparatus further includes:

a first removing module, configured to remove the header of the packet; and a first delivery module, configured to deliver the packet after the removal of the header to an upper layer of a BAP layer of the boundary node.

Optionally, the first determining module is further configured to:

in a case that the boundary node determines that a BAP destination address in the first information is the same as a real address of the boundary node and the first information includes first indication information, determine that the destination node of the packet belongs to the second topology, where the first indication information is used to directly indicate that cross-topology routing needs to be performed for the packet.

Optionally, the first information further includes a second path ID, and the second path ID is used to indicate a routing path from the boundary node to the destination node in the second topology.

Optionally, the first re-writing module is further configured to:

determine a second destination address of the destination node in the second topology based on a local third mapping table and the second path ID; and re-write the header of the packet based on the second path ID and the second destination address, where the third mapping table includes at least one third path ID and at least one third destination address, there is a mapping relationship between one third path ID and one or more third destination addresses, there is a mapping relationship between different third path IDs and different third destination addresses, the second path ID is one of the at least one third path ID, and the second destination address is one of the at least one third destination address.

Optionally, the first determining module is further configured to:

in a case that the boundary node determines that the BAP destination address in the first information is the same as the real address of the boundary node and the first information includes second indication information, determine that the destination node of the packet is the boundary node, where the second indication information is used to directly indicate that cross-topology routing does not need to be performed for the packet; and the apparatus further includes:

a second removing module, configured to remove the header of the packet; and a second delivery module, configured to deliver the packet after the removal of the header to an upper layer of a BAP layer of the boundary node.

Optionally, the first determining module is further configured to:

in a case that the boundary node determines that a backhaul adaptation protocol BAP destination address in the first information is the same as a third BAP virtual address of the boundary node, determine that the destination node of the packet belongs to the second topology, where the third BAP virtual address is used to indicate that cross-topology routing needs to be performed for the packet, and the third BAP virtual address is configured for the boundary node by a first centralized unit CU in the first topology or a second centralized unit CU in the second topology.

Optionally, the first information further includes a fourth path ID, and the fourth path ID is used to indicate a routing path from the boundary node to the destination node in the second topology; and the first re-writing module is further configured to:

determine a fourth destination address of the destination node in the second topology based on a local fourth mapping table and the fourth path ID; and re-write the header of the packet based on the fourth path ID and the fourth destination address, where the fourth mapping table includes at least one fifth path ID and at least one fifth destination address, there is a mapping relationship between one fifth path ID and one or more fifth destination addresses, there is a mapping relationship between different fifth path IDs and different fifth destination addresses, the fourth path ID is one of the at least one fifth path ID, and the fourth destination address is one of the at least one fifth destination address.

Optionally, the first determining module is further configured to:

in a case that the boundary node determines that the BAP destination address in the first information is the same as a real address of the boundary node, determine that the destination node of the packet is the boundary node; and the apparatus further includes:

a third removing module, configured to remove the header of the packet; and a third delivery module, configured to deliver the packet after the removal of the header to an upper layer of a BAP layer of the boundary node.

Optionally, the first information further includes a seventh path ID, and the seventh path ID is used to indicate a routing path from a generation node of the packet to the boundary node in the first topology.

Optionally, the first determining module is further configured to:

in a case that the boundary node determines that the BAP destination address in the first information is different from all addresses of the boundary node, determine that the destination node of the packet does not belong to the second topology; and the apparatus further includes:

a second transmission module, configured to transmit the packet according to a routing rule specified in a protocol.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

The data routing apparatus in this embodiment of this application may be an apparatus, an apparatus or an electronic device with an operating system, or a component, an integrated circuit, or a chip in a terminal. The apparatus or the electronic device may be a mobile terminal or a non-mobile terminal. For example, the mobile terminal may include but is not limited to the foregoing listed types of the terminal 11. The non-mobile terminal may be a server, a network attached storage (Network Attached Storage, NAS), a personal computer (personal computer, PC), a television (television, TV), a teller machine, or a self-service machine. This is not specifically limited in this embodiment of this application.

Figure 10:
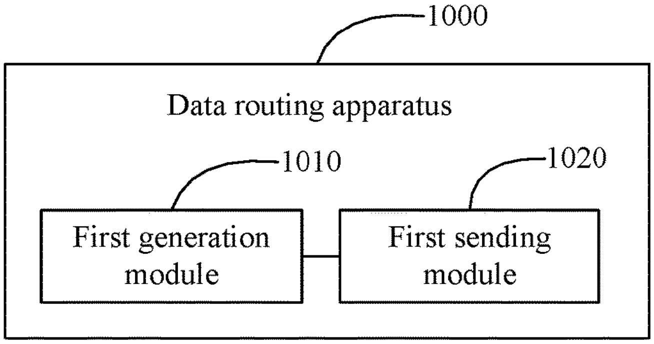
FIG. 10 is a second schematic structural diagram of a data routing apparatus according to an embodiment of this application.

FIG. 10 is a second schematic structural diagram of a data routing apparatus according to an embodiment of this application. As shown in FIG. 10, the data routing apparatus 1000 includes a first generation module 1010 and a first sending module 1020. The first generation module 1010 is configured to generate a packet in a first topology, where a header of the packet includes first information, and the first information is used to indicate ownership of a destination node of the packet.

The first sending module 1020 is configured to send the packet to a boundary node.

Optionally, the data routing apparatus may generate a packet in a first topology by using the first generation module 1010, where a header of the packet includes first information, and the first information is used to indicate ownership of a destination node of the packet; and send the packet to a boundary node by using the first sending module 1020.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, the apparatus further includes:

a second determining module, configured to: before the generation node in the first topology generates the packet, determine a first destination address of the packet on the destination node in a second topology;

a third determining module, configured to determine a first path ID based on the first destination address, where the first path ID is used to indicate a routing path from the boundary node to the destination node in the second topology; and a fourth determining module, configured to determine a first BAP virtual address in the first information based on a local first mapping table and first mapping information; and the first generation module is further configured to:

generate the packet, where a BAP destination address in the first information in the header of the packet is the same as the first BAP virtual address, where the first mapping information includes any one or any combination of the following:

a real address of the boundary node;
the first destination address; and
the first path ID, where
the first mapping table includes at least one fourth BAP virtual address and at least one piece of second mapping information, there is a mapping relationship between one piece of second mapping information and one fourth BAP virtual address, there is a mapping relationship between different second mapping information and different fourth BAP virtual addresses, the first BAP virtual address is one of the at least one fourth BAP virtual address, and the first mapping information is one of the at least one piece of second mapping information; and the at least one fourth BAP virtual address is configured for the boundary node by a first centralized unit CU in the first topology or a second centralized unit CU in the second topology.

Optionally, the first generation module is further configured to:

in a case that the destination node of the packet is the boundary node, generate the packet, where the BAP destination address in the first information in the header of the packet is the same as the real address of the boundary node.

Optionally, the first generation module is further configured to:

in a case that the destination node of the packet belongs to a second topology, generate the packet, where a BAP destination address in the first information in the header of the packet is the same as a real address of the boundary node, the first information includes first indication information, and the first indication information is used to directly indicate that cross-topology routing needs to be performed for the packet.

Optionally, the first information further includes a second path ID, and the second path ID is used to indicate a routing path from the boundary node to the destination node in the second topology.

Optionally, the first generation module is further configured to:

in a case that the destination node of the packet is the boundary node, generate the packet, where the BAP destination address in the first information in the header of the packet is the same as the real address of the boundary node, the first information includes second indication information, and the second indication information is used to directly indicate that cross-topology routing does not need to be performed for the packet.

Optionally, the first generation module is further configured to:

in a case that the destination node of the packet belongs to a second topology, generate the packet, where a BAP destination address in the first information in the header of the packet is the same as a third BAP virtual address, and the third BAP virtual address is used to indicate that cross-topology routing needs to be performed for the packet; and the third BAP virtual address is configured for the boundary node by a first centralized unit CU in the first topology or a second centralized unit CU in the second topology.

Optionally, the first information further includes a fourth path ID, and the fourth path ID is used to indicate a routing path from the boundary node to the destination node in the second topology.

Optionally, the first generation module is further configured to:

in a case that the destination node of the packet is the boundary node, generate the packet, where the BAP destination address in the first information in the header of the packet is the same as a real address of the boundary node.

Optionally, the first generation module is further configured to:

in a case that the destination node of the packet does not belong to the second topology, generate the packet, where the BAP destination address in the first information in the header of the packet is different from all addresses of the boundary node.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

The data routing apparatus in this embodiment of this application may be an apparatus, an apparatus or an electronic device with an operating system, or a component, an integrated circuit, or a chip in a terminal. The apparatus or the electronic device may be a mobile terminal or a non-mobile terminal. For example, the mobile terminal may include but is not limited to the foregoing listed types of the terminal 11. The non-mobile terminal may be a server, a network attached storage (Network Attached Storage, NAS), a personal computer (personal computer, PC), a television (television, TV), a teller machine, or a self-service machine. This is not specifically limited in this embodiment of this application.

The data routing apparatus provided in this embodiment of this application can implement the processes implemented in the method embodiments of FIG. 2 to FIG. 8, and achieve a same technical effect. To avoid repetition, details are not described herein again.

Figure 11:
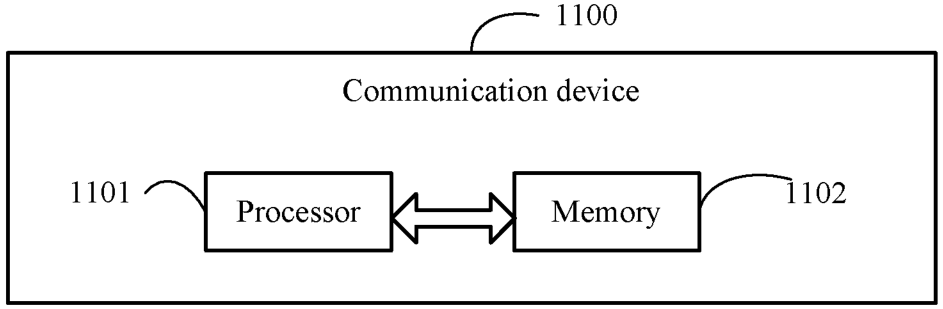
FIG. 11 is a schematic structural diagram of a communication device according to an embodiment of this application.

Optionally, FIG. 11 is a schematic structural diagram of a communication device according to an embodiment of this application. As shown in FIG. 11, an embodiment of this application further provides a communication device 1100, including a processor 1101, a memory 1102, a program or an instruction that is stored in the memory 1102 and that can be run on the processor 1101. For example, when the communication device 1100 is a terminal, the program or the instruction is executed by the processor 1101 to implement the processes of the foregoing data routing method embodiment, and a same technical effect can be achieved. When the communication device 1100 is a network ide device, the program or the instruction is executed by the processor 1101 to implement the processes of the foregoing data routing method embodiment, and a same technical effect can be achieved. To avoid repetition, details are not described herein again.

An embodiment of this application further provides a boundary node, including a processor and a communication interface. The communication interface is configured to:

receive a packet in a first topology.

The processor is configured to:

determine ownership of a destination node of the packet based on first information in a header of the packet; and in a case that it is determined that the destination node of the packet belongs to a second topology, re-write the header of the packet based on the first information.

The communication interface is further configured to:

transmit a re-written packet to the destination node in the second topology.

This boundary node embodiment corresponds to the foregoing boundary node method embodiment. Each implementation process and implementation of the foregoing method embodiment may be applicable to this boundary node embodiment, and a same technical effect can be achieved.

Figure 12:
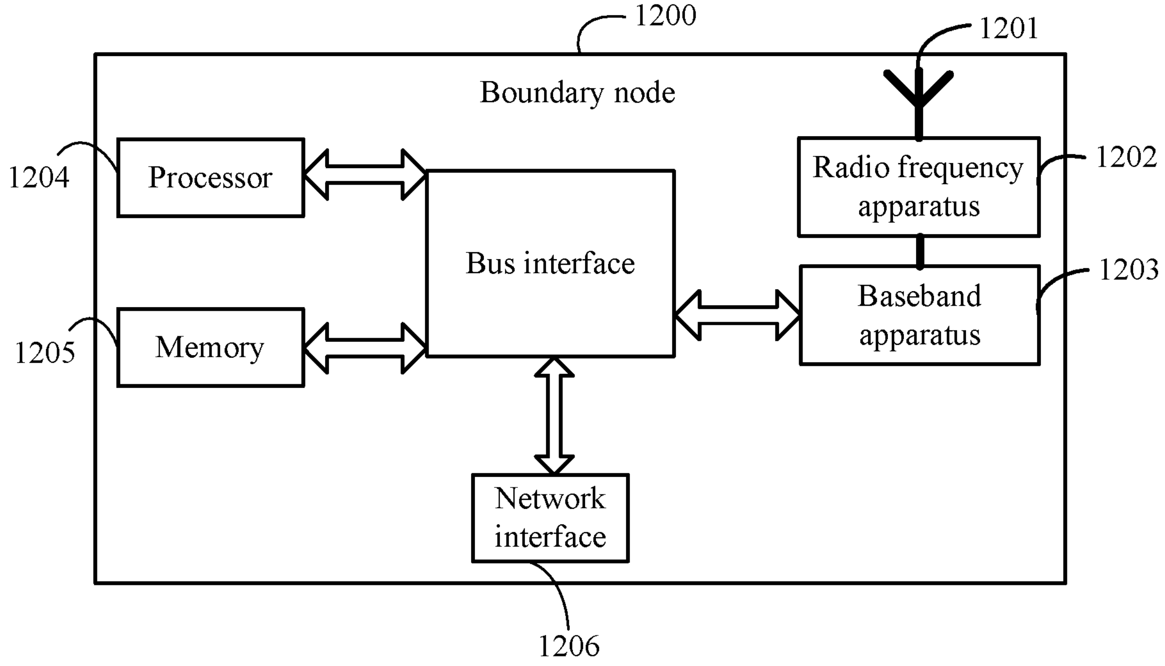
FIG. 12 is a schematic structural diagram of a boundary node according to an embodiment of this application.

Specifically, an embodiment of this application further provides a boundary node. FIG. 12 is a schematic structural diagram of a boundary node according to an embodiment of this application. As shown in FIG. 12, the boundary node device 1200 includes an antenna 1201, a radio frequency apparatus 1202, and a baseband apparatus 1203. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes information that needs to be sent, and sends processed information to the radio frequency apparatus 1202. The radio frequency apparatus 1202 processes the received information, and sends processed information by using the antenna 1201.

The band processing apparatus may be located in the baseband apparatus 1203. The method performed by the boundary node in the foregoing embodiment may be implemented in the baseband apparatus 1203. The baseband apparatus 1203 includes a processor 1204 and a memory 1205.

The baseband apparatus 1203 may include, for example, at least one baseband board, where a plurality of chips are disposed on the baseband board. As shown in FIG. 12, one chip, for example, the processor 1204, is connected to the memory 1205, to invoke a program in the memory 1205 to perform the operations of the boundary node shown in the foregoing method embodiment.

The baseband apparatus 1203 may further include a network interface 1206, configured to exchange information with the radio frequency apparatus 1202. For example, the interface is a common public radio interface (common public radio interface, CPRI for short).

Specifically, the boundary node in this embodiment of the present invention further includes an instruction or a program that is stored in the memory 1205 and that can be run on the processor 1204. The processor 1204 invokes the instruction or the program in the memory 1205 to perform the method performed by the modules shown in FIG. 9, and a same technical effect is achieved. To avoid repetition, details are not described herein again.

The processor 1204 is configured to:

receive a packet in a first topology;

determine ownership of a destination node of the packet based on first information in a header of the packet;

in a case that the destination node of the packet belongs to a second topology, re-write the header of the packet based on the first information; and transmit a re-written packet to the destination node in the second topology.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, the processor 1204 is further configured to:

in a case that the boundary node determines that a backhaul adaptation protocol BAP destination address in the first information is the same as a first BAP virtual address of the boundary node, determine that the destination node of the packet belongs to the second topology, where there is a mapping relationship between the first BAP virtual address and a first destination node information group of the packet, the first destination node information group includes a first destination address and a first path ID of the destination node in the second topology, and the first path ID is used to indicate a routing path from the boundary node to the destination node in the second topology.

Optionally, the processor 1204 is further configured to:

determine, based on a local second mapping table and the first BAP virtual address, the first destination node information group that has the mapping relationship with the first BAP virtual address; and re-write the header of the packet based on the first destination address and the first path ID in the second topology in the first destination node information group, where the second mapping table includes at least one second BAP virtual address and at least one second destination node information group, there is a mapping relationship between one second BAP virtual address and one or more second destination node information groups, there is a mapping relationship between different second BAP virtual addresses and different second destination node information groups, the first BAP virtual address is one of the at least one second BAP virtual address, and the first destination node information group is one of the at least one second destination node information group; and the at least one second BAP virtual address is configured for the boundary node by a first centralized unit CU in the first topology or a second centralized unit CU in the second topology.

Optionally, the processor 1204 is further configured to:

in a case that the boundary node determines that the BAP destination address in the first information is the same as a real address of the boundary node, determine that the destination node of the packet is the boundary node; and the processor 1204 is further configured to:

remove the header of the packet; and deliver the packet after the removal of the header to an upper layer of a BAP layer of the boundary node.

Optionally, the processor 1204 is further configured to:

in a case that the boundary node determines that a BAP destination address in the first information is the same as a real address of the boundary node and the first information includes first indication information, determine that the destination node of the packet belongs to the second topology, where the first indication information is used to directly indicate that cross-topology routing needs to be performed for the packet.

Optionally, the first information further includes a second path ID, and the second path ID is used to indicate a routing path from the boundary node to the destination node in the second topology.

Optionally, the processor 1204 is further configured to:

determine a second destination address of the destination node in the second topology based on a local third mapping table and the second path ID; and re-write the header of the packet based on the second path ID and the second destination address, where the third mapping table includes at least one third path ID and at least one third destination address, there is a mapping relationship between one third path ID and one or more third destination addresses, there is a mapping relationship between different third path IDs and different third destination addresses, the second path ID is one of the at least one third path ID, and the second destination address is one of the at least one third destination address.

Optionally, the processor 1204 is further configured to:

in a case that the boundary node determines that the BAP destination address in the first information is the same as the real address of the boundary node and the first information includes second indication information, determine that the destination node of the packet is the boundary node, where the second indication information is used to directly indicate that cross-topology routing does not need to be performed for the packet; and the processor 1204 is further configured to:

remove the header of the packet; and deliver the packet after the removal of the header to an upper layer of a BAP layer of the boundary node.

Optionally, the processor 1204 is further configured to:

in a case that the boundary node determines that a backhaul adaptation protocol BAP destination address in the first information is the same as a third BAP virtual address of the boundary node, determine that the destination node of the packet belongs to the second topology, where the third BAP virtual address is used to indicate that cross-topology routing needs to be performed for the packet, and the third BAP virtual address is configured for the boundary node by a first centralized unit CU in the first topology or a second centralized unit CU in the second topology.

Optionally, the first information further includes a fourth path ID, and the fourth path ID is used to indicate a routing path from the boundary node to the destination node in the second topology; and the processor 1204 is further configured to:

determine a fourth destination address of the destination node in the second topology based on a local fourth mapping table and the fourth path ID; and re-write the header of the packet based on the fourth path ID and the fourth destination address, where the fourth mapping table includes at least one fifth path ID and at least one fifth destination address, there is a mapping relationship between one fifth path ID and one or more fifth destination addresses, there is a mapping relationship between different fifth path IDs and different fifth destination addresses, the fourth path ID is one of the at least one fifth path ID, and the fourth destination address is one of the at least one fifth destination address.

Optionally, the processor 1204 is further configured to:

in a case that the boundary node determines that the BAP destination address in the first information is the same as a real address of the boundary node, determine that the destination node of the packet is the boundary node; and the processor 1204 is further configured to:

remove the header of the packet; and deliver the packet after the removal of the header to an upper layer of a BAP layer of the boundary node.

Optionally, the first information further includes a seventh path ID, and the seventh path ID is used to indicate a routing path from a generation node of the packet to the boundary node in the first topology.

Optionally, the processor 1204 is further configured to:

in a case that the boundary node determines that the BAP destination address in the first information is different from all addresses of the boundary node, determine that the destination node of the packet does not belong to the second topology; and the processor 1204 is further configured to:

transmit the packet according to a routing rule specified in a protocol.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

An embodiment of this application further provides a generation node, including a processor and a communication interface. The processor is configured to:

generate a packet in a first topology, where a header of the packet includes first information, and the first information is used to indicate ownership of a destination node of the packet.

The communication interface is configured to:

send the packet to a boundary node.

This generation node device embodiment corresponds to the foregoing generation node method embodiment. Each implementation process and implementation of the foregoing method embodiment may be applicable to this generation node embodiment, and a same technical effect can be achieved.

Figure 13:
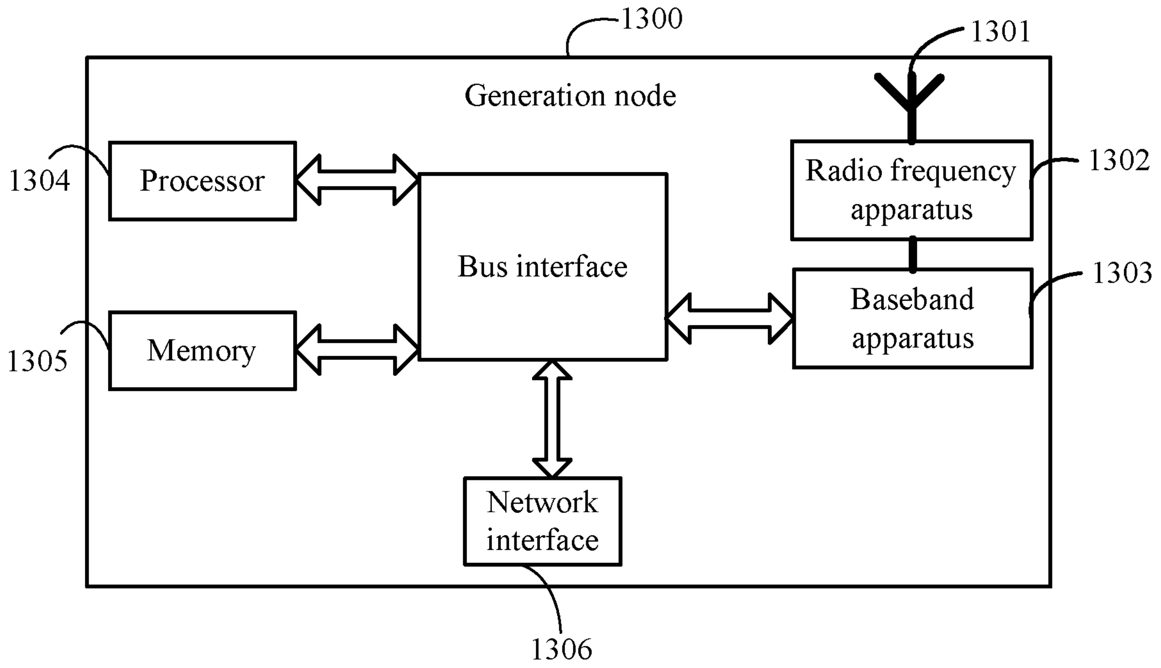
FIG. 13 is a schematic structural diagram of a generation node according to an embodiment of this application.

Specifically, an embodiment of this application further provides a generation node. FIG. 13 is a schematic structural diagram of a generation node according to an embodiment of this application. As shown in FIG. 13, the generation node 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the received information to the baseband apparatus 1303 for processing. In a downlink direction, the baseband apparatus 1303 processes information that needs to be sent, and sends processed information to the radio frequency apparatus 1302. The radio frequency apparatus 1302 processes the received information, and sends processed information by using the antenna 1301.

The band processing apparatus may be located in the baseband apparatus 1303. The method performed by the generation node in the foregoing embodiment may be implemented in the baseband apparatus 1303. The baseband apparatus 1303 includes a processor 1304 and a memory 1305.

The baseband apparatus 1303 may include, for example, at least one baseband board, where a plurality of chips are disposed on the baseband board. As shown in FIG. 13, one chip, for example, the processor 1304, is connected to the memory 1305, to invoke a program in the memory 1305 to perform the operations of the generation node shown in the foregoing method embodiment.

The baseband apparatus 1303 may further include a network interface 1306, configured to exchange information with the radio frequency apparatus 1302. For example, the interface is a common public radio interface (common public radio interface, CPRI for short).

Specifically, the generation node in this embodiment of the present invention further includes an instruction or a program that is stored in the memory 1305 and that can be run on the processor 1304. The processor 1304 invokes the instruction or the program in the memory 1305 to perform the method performed by the modules shown in FIG. 10, and a same technical effect is achieved. To avoid repetition, details are not described herein again.

The processor 1304 is configured to:

generate a packet in a first topology, where a header of the packet includes first information, and the first information is used to indicate ownership of a destination node of the packet; and send the packet to a boundary node.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

Optionally, the processor 1304 is further configured to:

in a case that the destination node of the packet belongs to a second topology, determine a first destination address of the packet on the destination node in the second topology;

determine a first path ID based on the first destination address, where the first path ID is used to indicate a routing path from the boundary node to the destination node in the second topology; and determine a first BAP virtual address in the first information based on a local first mapping table and first mapping information; and the processor 1304 is further configured to:

generate the packet, where a BAP destination address in the first information in the header of the packet is the same as the first BAP virtual address, where the first mapping information includes any one or any combination of the following:

a real address of the boundary node;

the first destination address; and the first path ID, where the first mapping table includes at least one fourth BAP virtual address and at least one piece of second mapping information, there is a mapping relationship between one piece of second mapping information and one fourth BAP virtual address, there is a mapping relationship between different second mapping information and different fourth BAP virtual addresses, the first BAP virtual address is one of the at least one fourth BAP virtual address, and the first mapping information is one of the at least one piece of second mapping information; and the at least one fourth BAP virtual address is configured for the boundary node by a first centralized unit CU in the first topology or a second centralized unit CU in the second topology.

Optionally, in a case that the destination node of the packet is the boundary node, the processor 1304 is further configured to:

generate the packet, where the BAP destination address in the first information in the header of the packet is the same as the real address of the boundary node.

Optionally, in a case that the destination node of the packet belongs to a second topology, the processor 1304 is further configured to:

generate the packet, where a BAP destination address in the first information in the header of the packet is the same as a real address of the boundary node, the first information includes first indication information, and the first indication information is used to directly indicate that cross-topology routing needs to be performed for the packet.

Optionally, the first information further includes a second path ID, and the second path ID is used to indicate a routing path from the boundary node to the destination node in the second topology.

Optionally, in a case that the destination node of the packet is the boundary node, the processor 1304 is further configured to:

generate the packet, where the BAP destination address in the first information in the header of the packet is the same as the real address of the boundary node, the first information includes second indication information, and the second indication information is used to directly indicate that cross-topology routing does not need to be performed for the packet.

Optionally, in a case that the destination node of the packet belongs to a second topology, the processor 1304 is further configured to:

generate the packet, where a BAP destination address in the first information in the header of the packet is the same as a third BAP virtual address, and the third BAP virtual address is used to indicate that cross-topology routing needs to be performed for the packet; and the third BAP virtual address is configured for the boundary node by a first centralized unit CU in the first topology or a second centralized unit CU in the second topology.

Optionally, the first information further includes a fourth path ID, and the fourth path ID is used to indicate a routing path from the boundary node to the destination node in the second topology.

Optionally, in a case that the destination node of the packet is the boundary node, the processor 1304 is further configured to:

generate the packet, where the BAP destination address in the first information in the header of the packet is the same as a real address of the boundary node.

Optionally, in a case that the destination node of the packet does not belong to the second topology, the processor 1304 is further configured to:

generate the packet, where the BAP destination address in the first information in the header of the packet is different from all addresses of the boundary node.

In this embodiment of this application, a boundary node determines ownership of a destination node of a packet based on first information in a header of the packet in a first topology; in a case that it is determined that the destination node of the packet belongs to a second topology, re-write the header of the packet based on the first information; and transmit a re-written packet to the destination node, to ensure that the boundary node can directly distinguish, from the header of the received packet, whether the data needs to be routed to the second topology, thereby reducing difficulty of data routing and saving resources.

An embodiment of this application further provides a readable storage medium. The readable storage medium stores a program or an instruction, and the program or the instruction is executed by a processor to implement the processes in the foregoing data routing method embodiment, and a same technical effect can be achieved. To avoid repetition, details are not described herein again.

The processor is a processor in the terminal in the foregoing embodiment. The readable storage medium includes a computer readable storage medium, for example, a read-only memory (Read-Only Memory, ROM), a random access memory (Random Access Memory, RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing data routing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program/program product. The computer program/program product is stored in a non-transient storage medium, and the program/program product is executed by at least one processor to implement the processes of the foregoing data routing method embodiment, and a same technical effect can be achieved. To avoid repetition, details are not described herein again.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by “includes a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

What is claimed is:

1. A data routing method, comprising:

receiving, by a boundary node, a packet in a first topology;

determining, by the boundary node, ownership of a destination node of the packet based on first information in a header of the packet;

in a case that the destination node of the packet belongs to a second topology, re-writing, by the boundary node, the header of the packet based on the first information; and transmitting, by the boundary node, a re-written packet to the destination node in the second topology, wherein the determining, by the boundary node, the ownership of the destination node of the packet based on the first information in a header of the packet comprises:

in a case that the boundary node determines that a backhaul adaptation protocol (BAP) destination address in the first information is the same as a third BAP virtual address of the boundary node, determining that the destination node of the packet belongs to the second topology, wherein the third BAP virtual address is used to indicate that cross-topology routing needs to be performed for the packet, and the third BAP virtual address is configured for the boundary node by a first CU in the first topology or a second CU in the second topology.

2. The data routing method according to claim 1, wherein the first information further comprises a fourth path ID, and the fourth path ID is used to indicate a routing path from the boundary node to the destination node in the second topology; and the re-writing, by the boundary node, the header of the packet based on the first information comprises:

determining, by the boundary node, a fourth destination address of the destination node in the second topology based on a local fourth mapping table and the fourth path ID; and re-writing the header of the packet based on the fourth path ID and the fourth destination address, wherein the fourth mapping table comprises at least one fifth path ID and at least one fifth destination address, there is a mapping relationship between one fifth path ID and one or more fifth destination addresses, there is a mapping relationship between different fifth path IDs and different fifth destination addresses, the fourth path ID is one of the at least one fifth path ID, and the fourth destination address is one of the at least one fifth destination address.

3. The data routing method according to claim 1, wherein the determining, by the boundary node, the ownership of the destination node of the packet based on the first information in the header of the packet comprises:

in a case that the boundary node determines that the BAP destination address in the first information is the same as a real address of the boundary node, determining that the destination node of the packet is the boundary node; and the method further comprises:

removing the header of the packet; and delivering the packet after the removal of the header to an upper layer of a BAP layer of the boundary node.

4. The data routing method according to claim 1, wherein the determining, by the boundary node, the ownership of the destination node of the packet based on the first information in the header of the packet further comprises:

in a case that the boundary node determines that the BAP destination address in the first information is different from all addresses of the boundary node, determining that the destination node of the packet does not belong to the second topology; and the method further comprises:

transmitting the packet according to a routing rule specified in a protocol.

5. A non-transitory readable storage medium, wherein a program or an instruction is stored on the non-transitory readable storage medium, and the program or the instruction is executed by a processor of a boundary node to implement the steps of the data routing method according to claim 1.

6. A data routing method, comprising:

generating, by a generation node in a first topology, a packet, wherein a header of the packet comprises first information, and the first information is used to indicate ownership of a destination node of the packet; and sending, by the generation node, the packet to a boundary node, wherein in a case that the destination node of the packet belongs to a second topology, the generating, by the generation node in the first topology, the packet comprises:

generating, by the generation node, the packet, wherein a backhaul adaptation protocol (BAP) destination address in the first information in the header of the packet is the same as a third BAP virtual address, and the third BAP virtual address is used to indicate that cross-topology routing needs to be performed for the packet; and the third BAP virtual address is configured for the boundary node by a first CU in the first topology or a second CU in the second topology.

7. The data routing method according to claim 6, wherein in a case that the destination node of the packet is the boundary node, the generating, by the generation node in the first topology, the packet comprises:

generating, by the generation node, the packet, wherein the BAP destination address in the first information in the header of the packet is the same as a real address of the boundary node.

8. The data routing method according to claim 6, wherein in a case that the destination node of the packet does not belong to the second topology, the generating, by a generation node in a first topology, a packet comprises:

generating, by the generation node, the packet, wherein the BAP destination address in the first information in the header of the packet is different from all addresses of the boundary node.

9. A generation node, comprising a processor, a memory, and a program or an instruction that is stored in the memory and executable on the processor, wherein the program or the instruction is executed by the processor to implement the steps of the data routing method according to claim 6.

10. A non-transitory readable storage medium, wherein a program or an instruction is stored on the non-transitory readable storage medium, and the program or the instruction is executed by a processor of a generation node to implement the steps of the data routing method according to claim 6.

11. A boundary node, comprising a processor, a memory, and a program or an instruction that is stored in the memory and executable on the processor, wherein the program or the instruction is executed by the processor to implement:

receiving, by the boundary node, a packet in a first topology;

determining, by the boundary node, ownership of a destination node of the packet based on first information in a header of the packet;

in a case that the destination node of the packet belongs to a second topology, re-writing, by the boundary node, the header of the packet based on the first information; and transmitting, by the boundary node, a re-written packet to the destination node in the second topology, wherein the determining, by the boundary node, the ownership of the destination node of the packet based on the first information in a header of the packet comprises:

in a case that the boundary node determines that a backhaul adaptation protocol (BAP) destination address in the first information is the same as a third BAP virtual address of the boundary node, determining that the destination node of the packet belongs to the second topology, wherein the third BAP virtual address is used to indicate that cross-topology routing needs to be performed for the packet, and the third BAP virtual address is configured for the boundary node by a first CU in the first topology or a second CU in the second topology.

12. The boundary node according to claim 11, wherein the first information further comprises a fourth path ID, and the fourth path ID is used to indicate a routing path from the boundary node to the destination node in the second topology; and the re-writing, by the boundary node, the header of the packet based on the first information comprises:

determining, by the boundary node, a fourth destination address of the destination node in the second topology based on a local fourth mapping table and the fourth path ID; and re-writing the header of the packet based on the fourth path ID and the fourth destination address, wherein the fourth mapping table comprises at least one fifth path ID and at least one fifth destination address, there is a mapping relationship between one fifth path ID and one or more fifth destination addresses, there is a mapping relationship between different fifth path IDs and different fifth destination addresses, the fourth path ID is one of the at least one fifth path ID, and the fourth destination address is one of the at least one fifth destination address.

13. The boundary node according to claim 11, wherein the determining, by the boundary node, the ownership of the destination node of the packet based on the first information in the header of the packet comprises:

in a case that the boundary node determines that the BAP destination address in the first information is the same as a real address of the boundary node, determining that the destination node of the packet is the boundary node; and the program or the instruction is further executed by the processor to implement:

removing the header of the packet; and delivering the packet after the removal of the header to an upper layer of a BAP layer of the boundary node.

14. The boundary node according to claim 11, wherein the determining, by the boundary node, the ownership of the destination node of the packet based on the first information in the header of the packet further comprises:

in a case that the boundary node determines that the BAP destination address in the first information is different from all addresses of the boundary node, determining that the destination node of the packet does not belong to the second topology; and the program or the instruction is further executed by the processor to implement:

transmitting the packet according to a routing rule specified in a protocol.

* * * * *